United States Patent
Nagasaka

(10) Patent No.: US 7,400,939 B2
(45) Date of Patent: Jul. 15, 2008

(54) ROBOT DEVICE, MOTION CONTROL DEVICE FOR ROBOT DEVICE AND MOTION CONTROL METHOD

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 870 days.

(21) Appl. No.: 10/500,372

(22) PCT Filed: Oct. 29, 2003

(86) PCT No.: PCT/JP03/13870

§ 371 (c)(1),
(2), (4) Date: Sep. 14, 2004

(87) PCT Pub. No.: WO2004/041484

PCT Pub. Date: May 21, 2004

(65) Prior Publication Data

US 2005/0038560 A1    Feb. 17, 2005

(30) Foreign Application Priority Data

Nov. 6, 2002  (JP) .............................. 2002-322582
Oct. 27, 2003  (JP) .............................. 2003-365549

(51) Int. Cl.
*G06F 19/00* (2006.01)

(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46

(58) Field of Classification Search ................ 700/245, 700/251, 253, 260, 261; 318/568.1, 568.12, 318/568.16, 568.17, 568.2; 901/9, 46, 180.1
See application file for complete search history.

(56) References Cited

U.S. PATENT DOCUMENTS 5,838,130 A * 11/1998 Ozawa ..................... 318/568.2

(Continued)

FOREIGN PATENT DOCUMENTS

WO    03/057426    7/2003

OTHER PUBLICATIONS

Verdonck et al., Combining internal and external robot models to improve model parameter estimation, 2001, IEEE, p. 2864-2851.*

(Continued)

*Primary Examiner*—Khoi H. Tran
*Assistant Examiner*—McDieunel Marc
(74) *Attorney, Agent, or Firm*—Oblon, Spivak, McClelland, Maier & Neustadt, P.C.

(57) ABSTRACT

A motion equation with a boundary condition regarding a future center-of-gravity horizontal trajectory of a robot is solved so that the moment around a horizontal axis at a point within a support polygon is zero when the robot is in contact with a floor or so that horizontal translational force is zero when the robot is not in contact with the floor and so that connection is made to a current horizontal position and speed of the center of gravity. In addition, a motion equation with a boundary condition regarding a future center-of-gravity vertical trajectory of the robot is solved so that vertical translational force acting upon the robot other than gravity is zero when the robot is not in contact with the floor and so that connection is made to a current vertical position and speed of the center of gravity. A motion state of a next time is determined so that, when the robot is not in contact with the floor, the moment around the center of gravity is zero, and the determined center-of-gravity position is achieved. Therefore, a stable motion pattern which allows transition between a floor contact period and a floor non-contact period is generated in real time.

19 Claims, 9 Drawing Sheets

U.S. PATENT DOCUMENTS

| | | | |
|---|---|---|---|
| 5,872,893 A * | 2/1999 | Takenaka et al. | 700/245 |
| 6,064,168 A * | 5/2000 | Tao et al. | 318/568.21 |
| 6,243,623 B1 * | 6/2001 | Takenaka et al. | 700/245 |
| 6,289,265 B1 * | 9/2001 | Takenaka et al. | 700/245 |
| 6,463,356 B1 * | 10/2002 | Hattori et al. | 700/245 |
| 6,493,606 B2 * | 12/2002 | Saijo et al. | 700/245 |
| 6,580,969 B1 * | 6/2003 | Ishida et al. | 700/245 |
| 6,584,377 B2 * | 6/2003 | Saijo et al. | 700/245 |
| 6,992,455 B2 * | 1/2006 | Kato et al. | 318/568.12 |
| 7,053,577 B2 * | 5/2006 | Nagasaka | 318/568.12 |

OTHER PUBLICATIONS

Lee et al., A perturbation/Correlation method for force guided robot assembly, 1999, IEEE, p. 764-773.*

Takahashi et al., Posture control for biped robot walk with foot toe and sole, 2001, IEEE, p. 329-334.*

Tkahashi et al., Posture control using foot toe and sole for biped walking robot "Ken", 2002, IEEE, p. 437-442.*

* cited by examiner

ROBOT DEVICE, MOTION CONTROL DEVICE FOR ROBOT DEVICE AND MOTION CONTROL METHOD

TECHNICAL FIELD

The present invention relates to a robot apparatus having at least a plurality of movable legs, and a device and method for controlling the motion of the robot apparatus. More particularly, the present invention relates to a robot apparatus capable of motion having a floor contact period and a floor non-contact period, such as running or hopping, in addition to motion having only a floor contact period, such as walking; and a device and a method for controlling the motion of the robot apparatus.

Even more particularly, the present invention relates to a robot apparatus capable of seamlessly changing between walking/stopping states and running/hopping or jumping states while properly maintaining dynamic balance even during a change between irregular floor contact motion and floor non-contact motion, and a device and method for controlling the motion of the robot apparatus. Still even more particularly, the present invention relates to a robot apparatus which can generate in real time a stable motion pattern for changing between a floor contact motion and a floor non-contact motion; and a device and a method for controlling the motion of the robot apparatus.

BACKGROUND ART

A robot is a mechanical device which moves like a human being by making use of electric and magnetic actions. The term "robot" is said to be derived from the Slavic word "ROBOTA" (slavish machine). In our country, the widespread use of robots began at the end of the 1960s, many of which were industrial robots, such as manipulators and conveyance robots, used, for example, for the purpose of achieving automatic industrial operations in factories without humans in attendance.

In recent years, advances have been made in the research and development of legged mobile robots which are designed using as a model the motion and mechanism of the body of an animal, such as a human being or an ape, which moves erect using two feet. There are increasing expectations for putting such robots into practical use. Legged mobile robots which reproduce the motions and bodily mechanisms of a human being are called humanoid robots.

Bipedal motion in an erect orientation is unstable compared to, for example, crawling or motion using four or six legs. Therefore, in this case, the orientation and walking are difficult to control. However, bipedal motion in an erect orientation is advantageous in that it is a flexible motion. Therefore, robots capable of such a motion can, for example, move along a walking surface of a working path, such as a rough surface or a surface having obstacles, or move along a discontinuous surface, such as moving up and down steps or a ladder.

Many technologies for controlling the orientation of and allowing stable walking of bipedal mobile robots have already been proposed. Here, "stable walking" means "moving using the legs without falling." Controlling the orientations of robots for achieving stable orientations is very important in preventing the robots from falling. One reason is that, when robots fall, they stop performing their tasks, as a result of which considerable time and labor are required for the robots to get up and re-start their actual tasks again. Another reason is that, when robots fall, the robots themselves or objects against which the falling robots strike may be fatally damaged.

Many of the technologies for controlling the orientations of legged mobile robots or preventing them from falling while walking make use of ZMP (zero moment point) as a norm for determining the degree of walking stability. The norm for determining the degree of walking stability by ZMP is based on D'Alembert's principle in which gravitation and inertial force from a walking system to a floor surface and their moments balance floor reaction force and floor reaction moment from the floor surface to the walking system. The inference in terms of dynamics is that there is a point, that is, a ZMP where a pitch axis moment and a roll axis moment are zero on or within a side of a supporting polygon (that is, a ZMP stable area) defined by a floor surface and the points of contact of the soles with the floor. (Refer to, for example, "Legged Locomotion Robots" by Miomir Vukobratovic', and "Hoko Robot to Jinko no Ashi" by Ichiro Kato and published by The Nikkan Kogyo Shinbun Ltd.)

In summary, at any instant of walking, ZMP exists within the supporting polygon defined by the feet and floor surface and is a point allowing a robot to walk stably without falling (rotary motion of the body) as long as the robot exerts a force upon the floor surface in a pushing direction.

According to a bipedal walking pattern based on ZMP, the points where the soles contact the floor can be previously set, so that, for example, it is easy to consider kinematic constraints on the ends of the feet in accordance with the shape of the floor surface. When ZMP is used as a norm for determining the degree of stability, a trajectory instead of force is used as a target value for controlling motion. Therefore, technically speaking, the probability putting ZMP into practical use is increased.

The mode of motion of most of the related legged mobile robots is walking in which either leg is always in contact with the floor surface. For legged mobile robots for ordinary use, walking is a safe, efficient, and optimal mode of motion because excessive force is not applied to a mechanical/electrical system.

Motion having a floor non-contact period in which reaction from the floor is not received is a situation in which it is not sufficient for legged mobile robots to have only a walking function. When legged mobile robots move in contact with the floor where there is gravity, they are not continuously in a floor non-contact state for a long period of time. However, they may be in a floor non-contact state for a short period of time or discontinuously. Examples of such situations are jumping across a gap, jumping down from a higher level, running to move faster, and changing the standing position by hopping for maintaining balance.

There are still not many examples of research on controlling balance when such legged mobile robots are not in contact with a surface. Outstanding pioneering researches are disclosed in, for example, "Hanpuku Choyaku Model Biomechanism 5," 1985, published by University of Tokyo Press, Kiyotoshi Matsuoka, pp. 4501-4509; and the International Journal of Robotics Research, vol. 3, No. 2, 1984, Marc H. Raibert and two other: "Experiments in Balance with a 3D One-Legged Hopping Machine," pp. 75-92. However, these researches have not been successful in providing a practical control system of legged mobile robots for the following reasons.

① Since massless legs are assumed, considerable limitations are placed on mechanical designing freedom.

② Since only continuous hopping or jumping is assumed, the dynamics regarding transition to a walking state or stopped state is not satisfactorily studied.

③ It is difficult to impose geometrical constraints on the trajectories of the ends of the feet.

A method of calculating a motion pattern of a legged mobile robot when floor contact and floor non-contact conditions are mixed by expanding the use of the ZMP norm is disclosed in "Dorikigaku Filter ni yoru Ningengata Robot no Zenshin Undo Seisei," authored by Keiichiro Nagasaka, in Tokyo Daigaku Kogakubu Joho Kogaku Senko Hakase Ronbun, 1999. However, according to this document, since a convergence calculation is performed to solve a nonlinear equation, the calculation load is high, making it necessary to previously calculate a motion pattern offline. In other words, a motion pattern having a floor contact period and a floor contact period in, for example, walking, running, or hopping, cannot be generated in real time.

As described above, today, the method of calculating a motion pattern based on a ZMP norm is the dominant basic controlling method for controlling the motion of a legged mobile robot. The greatest merit of using the ZMP as a norm for determining the stability of the body of a robot is that it is of high practical use, such as ZMP easily providing geometrical constraints on the ends of the feet or being applicable to a wide range of mechanical models, etc. For example, there is a report about a structure of a flexible control system based on a technology of generating walking pattern a real time in order to allow a robot to walk while generating a stable motion pattern on board during its motion. (Refer to, for example, Japanese Patent Application No. 2002-288745 already assigned to the applicant.)

As mentioned above, practical controlling means for motion including a floor non-contact period, such as in walking/hopping, has not yet been proposed.

The first problem that prevents legged motion including a floor contact period and a floor non-contact period from being practically realized is that most of the controlling methods impose many limitations regarding mechanical models. In particular, since many of the methods ignore the masses of the legs because it is difficult to handle changes in inertia of a robot caused by leg motions above a surface, these methods cannot be applied to many practical legged mobile robots. (Refer to, for example, "Hanpuku Choyaku Model Biomechanism 5," 1985, published by University of Tokyo Press, Kiyotoshi Matsuoka, pp. 4501-4509; and the International Journal of Robotics Research, vol. 3, No. 2, 1984, Marc H. Raibert and two other: "Experiments in Balance with a 3D One-Legged Hopping Machine," pp. 75-92.)

Typical present-day humanoid robots have at least six degrees of freedom in one leg. Although such a legged mobile robot having many degrees of freedom in its leg requires many actuators, it is difficult to mount all of these many actuators to its main body (portion of the body near the center of gravity, such as the waist), and a considerable number of actuators are installed in the legs (probably to prevent accidental torque interference by wire conduction.) In the first place, the legs support the entire weight of a legged mobile robot, and, thus, must have mechanical strength. Therefore, the structural members have considerable weight.

Therefore, in general, the masses of the legs are increased, and, thus, cannot be ignored in a dynamic model. Consequently, it is difficult to apply related techniques to legged mobile robots having large leg masses.

The second problem is that the number of running/hopping controlling algorithms for allowing transition between walking and stopping states is small.

As already mentioned above, a legged mobile robot rarely runs or hops constantly, and, thus, is often in a stopped state or a walking state. When necessary, the robot is made to run/hop, after which it is made to walk or stop again. Depending upon the circumstances, a robot may suddenly hop from a floor contact state, or may walk gradually faster and run, and, then, smoothly slow down, walk, and stop again.

There is an earnest desire for a general controlling method which makes it possible to perform seamless motion changes even between various, irregular contact and non-contact motions while properly maintaining dynamic balance.

The third problem is that most of the running/hopping or jumping controlling methods cannot add geometrical constraints.

In particular, there are many situations in which geometrical constraints are to be imposed upon position/orientation trajectories of feet end points in an inertial coordinate system. There are many methods of manipulating a floor contact point in order to maintain balance of the body of a robot. In order to quantitatively control a legged mobile robot, it is desirable that the trajectories of the feet ends be capable of being manifestly specified. For example, it is desirable that parameters, such as walking footstep/period or the heights of the soles when hopping or jumping, be capable of being specified by a user program. When the robot is required to, for example, run up steps or jump over a plurality of successive gaps, it is not desirable to manipulate the trajectories of the feet ends for maintaining balance.

The method of controlling walking by generating a walking pattern based on a ZMP norm is very advantageous from the practical point of view in that it can impose such motion constraints. This advantage is also demanded when the use of a ZMP norm is expanded to a motion having a floor non-contact period.

The fourth problem is that there is an earnest demand for a method which can change a motion pattern in real time so as to satisfy an asynchronous outside request.

In order to allow free motion of a legged mobile robot in an actual environment, it is necessary to provide a function for immediately re-planning the motion of the whole body while maintaining dynamic balance so as to satisfy a request for a change in the motion of the upper part of the body and a request for a change in crural motion, such as footstep, step period, angle of traverse, or feet lifting height, input at various timings. Previously forming a motion pattern offline will not satisfy such requests. In addition, it is difficult to satisfy the aforementioned outside requests by a control system which only maintains balance.

DISCLOSURE OF INVENTION

Accordingly, it is an object of the present invention to provide an excellent robot apparatus capable of motion having a floor contact period and a floor non-contact period, such as in running and hopping, in addition to motion having only a floor contact period, such as in walking; and a device and a method for controlling the motion of the robot apparatus.

It is another object of the present invention to provide an excellent robot apparatus capable of seamlessly changing between walking/stopping states and running/hopping or jumping states while properly maintaining dynamic balance even during a change between irregular floor contact motion and floor non-contact motion; and a device and a method for controlling the motion of the robot apparatus.

It is still another object of the present invention to provide an excellent robot apparatus which can generate in real time a stable motion pattern for changing between a floor contact motion and a floor non-contact motion, and a device and a method for controlling the motion of the robot apparatus.

To overcome the aforementioned problems, the present invention provides a robot apparatus comprising:

movable means;

center-of-gravity horizontal position trajectory determining means for solving a motion equation with a boundary condition regarding a center-of-gravity horizontal position trajectory of the robot apparatus so that the moment around a horizontal axis at a point within a support polygon defined by a plurality of portions of the movable means contacting a floor is zero or approximately equal to zero, and so that at least the position and speed of the center of gravity of the robot apparatus in a next control period are connected to the position and speed of the center of gravity of the robot apparatus in a current control period when the movable means is in contact with the floor;

center-of-gravity vertical position trajectory determining means for solving a motion equation with a boundary condition regarding a center-of-gravity vertical position trajectory of the robot apparatus so that vertical translational force acting upon the robot apparatus other than gravity is equal to or approximately equal to zero, and so that the vertical position and speed of the center of gravity of the robot apparatus in the next control period are connected to the vertical position and speed of the center of gravity of the robot apparatus in the current control period when the movable means is not in contact with the floor; and motion state determining means for determining a motion state of the robot apparatus in the next control period so that the moment around the center of gravity of the robot apparatus is equal to or approximately equal to zero, and so that the position of the center of gravity determined by the center-of-gravity horizontal position trajectory determining means and the center-of-gravity vertical position trajectory determining means is satisfied when the movable means is not in contact with the floor.

The center-of-gravity horizontal position trajectory determining means, for example, calculates the center-of-gravity horizontal position trajectory of the robot apparatus based on the moment around the horizontal axis acting upon the robot apparatus and a temporal continuity of at least the position and speed of the center of gravity of the robot apparatus when movable means is in contact with the floor. The center-of-gravity vertical position trajectory determining means, for example, calculates the center-of-gravity vertical position trajectory of the robot apparatus based on vertical translational force acting upon the robot apparatus other than gravity and a temporal continuity of at least the vertical position and the speed of the center of gravity of the robot apparatus when the movable means is not in contact with the floor. The motion state determining means, for example, determines a motion state of the robot apparatus so that the moment around the center of gravity of the robot apparatus and the position of the center of gravity determined by the center-of-gravity horizontal position trajectory determining means and the center-of-gravity vertical position trajectory determining means are satisfied when the movable means is not in contact with the floor.

According to the robot apparatuses of the present invention, the center-of-gravity horizontal-position trajectory determining means and the center-of-gravity vertical-position trajectory determining means solve the motion equations with boundary conditions regarding the center-of-gravity horizontal-position trajectory and the center-of-gravity vertical-position trajectory for every control period. The motion state determining means determines the motion state of the robot apparatus for each control period while adjusting the moment around the center of gravity of the robot apparatus. Therefore, the motion of the robot apparatus can be controlled in real time.

Here, the motion state determining means may determine the motion state of the robot apparatus in the next control period while adjusting the moment generated at the robot apparatus using Jacobian determined from a motion state of the robot apparatus in the current control period.

The center-of-gravity horizontal position trajectory determining means may be such as to solve the motion equation with the boundary condition regarding the center-of-gravity horizontal position trajectory of the robot apparatus so that ZMP where the moment around a pitch axis and the moment around a roll axis of the robot apparatus are zero exists within the support polygon instead of the moment around the horizontal axis at the point within the support polygon being equal to or approximately equal to zero when the movable means is in contact with the floor.

The center-of-gravity horizontal position trajectory determining means may be such as to solve the motion equation with the boundary condition regarding the center-of-gravity horizontal position trajectory of the robot apparatus so that the horizontal momentum is substantially constant instead of the horizontal translational force being equal to or approximately equal to zero when the movable means is not in contact with the floor.

The robot apparatus of the present invention may further comprise center-of-gravity position/speed measuring means for measuring the position and the speed of the center of gravity of the robot apparatus. In this case, the center-of-gravity horizontal position trajectory determining means and the center-of-gravity vertical position trajectory determining means can set the position and speed of the center of gravity of the robot apparatus in the current control period measured by the center-of-gravity position/speed measuring means as an initial boundary condition of the next control period for the motion equations with the boundary conditions.

The motion state determining means may determine the motion state of the robot apparatus using the orientation angle of a main body of the robot apparatus as a manipulation quantity.

The motion state determining means may determine the motion state of the robot apparatus using a waist joint angle of the robot apparatus as a manipulation quantity.

The motion state determining means may determine the motion state of the robot apparatus in the next control period so that the angular momentum around the center of gravity is constant instead of the moment around the center of gravity of the robot apparatus being equal to or approximately equal to zero when the movable means is not in contact with the floor.

Other objects, features, and advantages of the present invention will become apparent from a detailed description of the present invention based on an embodiment described below and the attached drawings.

BEST MODE FOR CARRYING OUT THE INVENTION

The present invention provides a controlling method which makes it possible to generate a dynamically stable motion pattern in real time for a motion having a floor contact period and a floor non-contact period in a legged mobile robot. The controlling method of the present invention makes it possible for the legged mobile robot to move by immediately calculating a dynamically stable motion pattern while satisfying outside requests, such as footstep/period, in a situation in which the legged mobile robot not only walks but also hops or jumps or runs or successively performs these motions.

Hereunder, an embodiment of the present invention will be described in detail with reference to the drawings.

Figure 1:
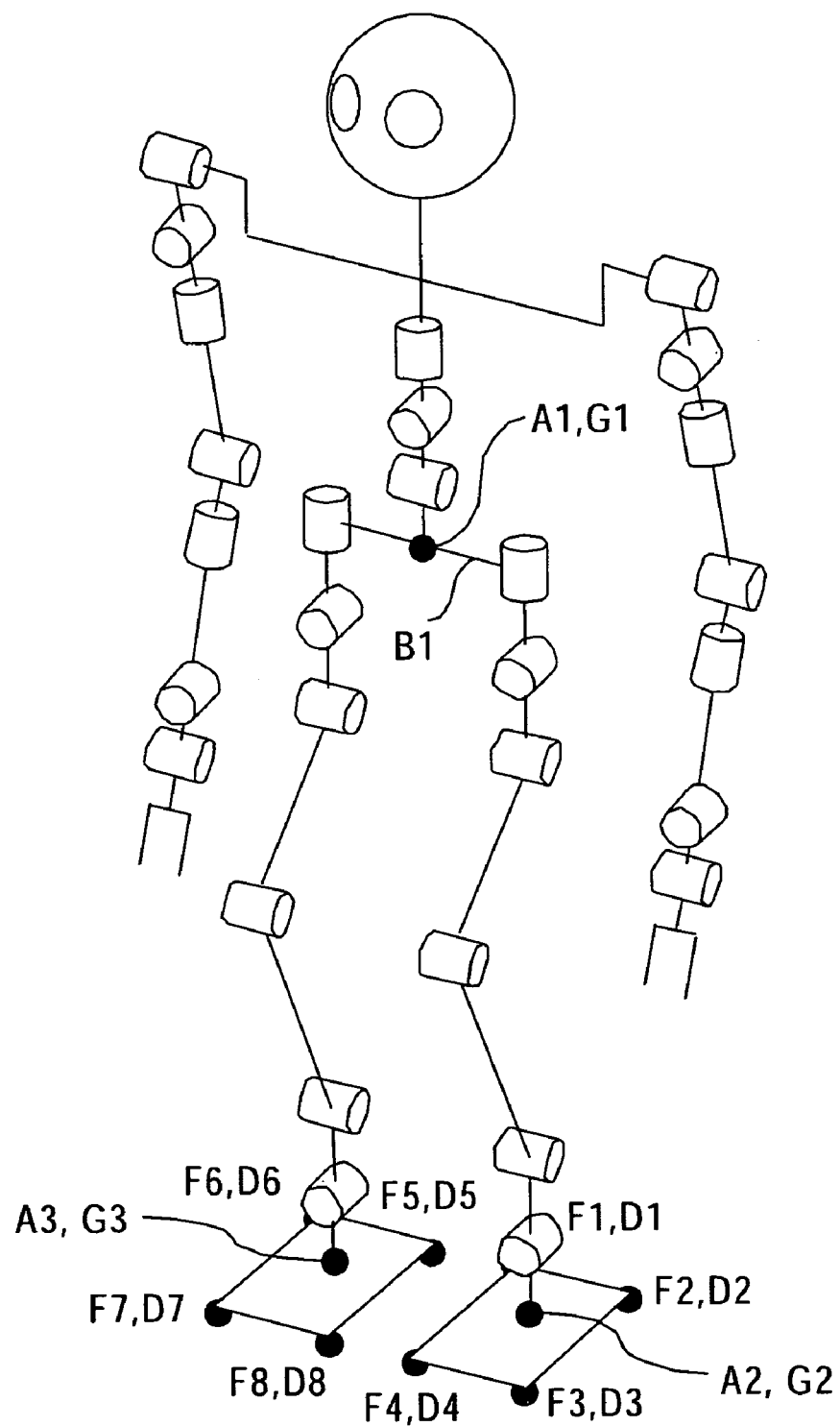
FIG. 1 is a schematic view of the structure of a legged mobile robot of an embodiment showing its degrees of freedom.

FIG. 1 is a schematic view of the structure of a legged mobile robot of an embodiment showing its degrees of freedom.

The robot shown in FIG. 1 has four limbs, the left and right arms and the left and right legs, mounted to a main body. Each of the left and right arms has seven degrees of freedom provided in correspondence with a shoulder joint pitch axis, a shoulder joint roll axis, an upper arm yaw axis, an elbow joint pitch axis, a forearm yaw axis, a wrist roll axis, and a wrist pitch axis. Each of the left and right legs has six degrees of freedom provided in correspondence with a hip joint yaw axis, a hip joint roll axis, a hip joint pitch axis, a knee pitch axis, an ankle pitch axis, and an ankle roll axis. A pelvis B1 joining the left and right hip joints corresponds to a main body link. The upper part of the body is connected to the main body link B1 through waist joints having three degrees of freedom (roll, pitch, and yaw), and the upper part of the body and the legs each having six degrees of freedom are joined to the main body link B1.

The degree of freedom of each joint is actually realized by an actuator/motor. In the embodiment, small AC servo actuators which are directly connected to gears and which incorporate in a motor unit a servo control system formed into a one-chip system. An AC servo actuator of this type is disclosed in, for example, Japanese Unexamined Patent Application Publication No. 2000-299970 (Japanese Patent Application No. 11-33386) which has already been assigned to the applicant.

An acceleration sensor A1 and a gyro G1 are mounted to the pelvis of the robot body. Uniaxial load cells (F1 to F8) and infrared distance measuring sensors (D1 to D8) are mounted such that four of the load cells and four of the sensors are mounted to four corners of the left sole and the remaining four load cells and the remaining four sensors are mounted to the four corners of the right sole. Acceleration sensors (A2 and A3) and gyros (G2 and G3) are mounted to the centers of the left and right soles, respectively.

Here, the mass of the robot is represented by m, the position of the center-of-gravity in an inertial coordinate system is represented by $x=(x, y, Z)^T$, and an external force and an external moment exerted upon the robot are represented by F and N, respectively.

Figure 2:
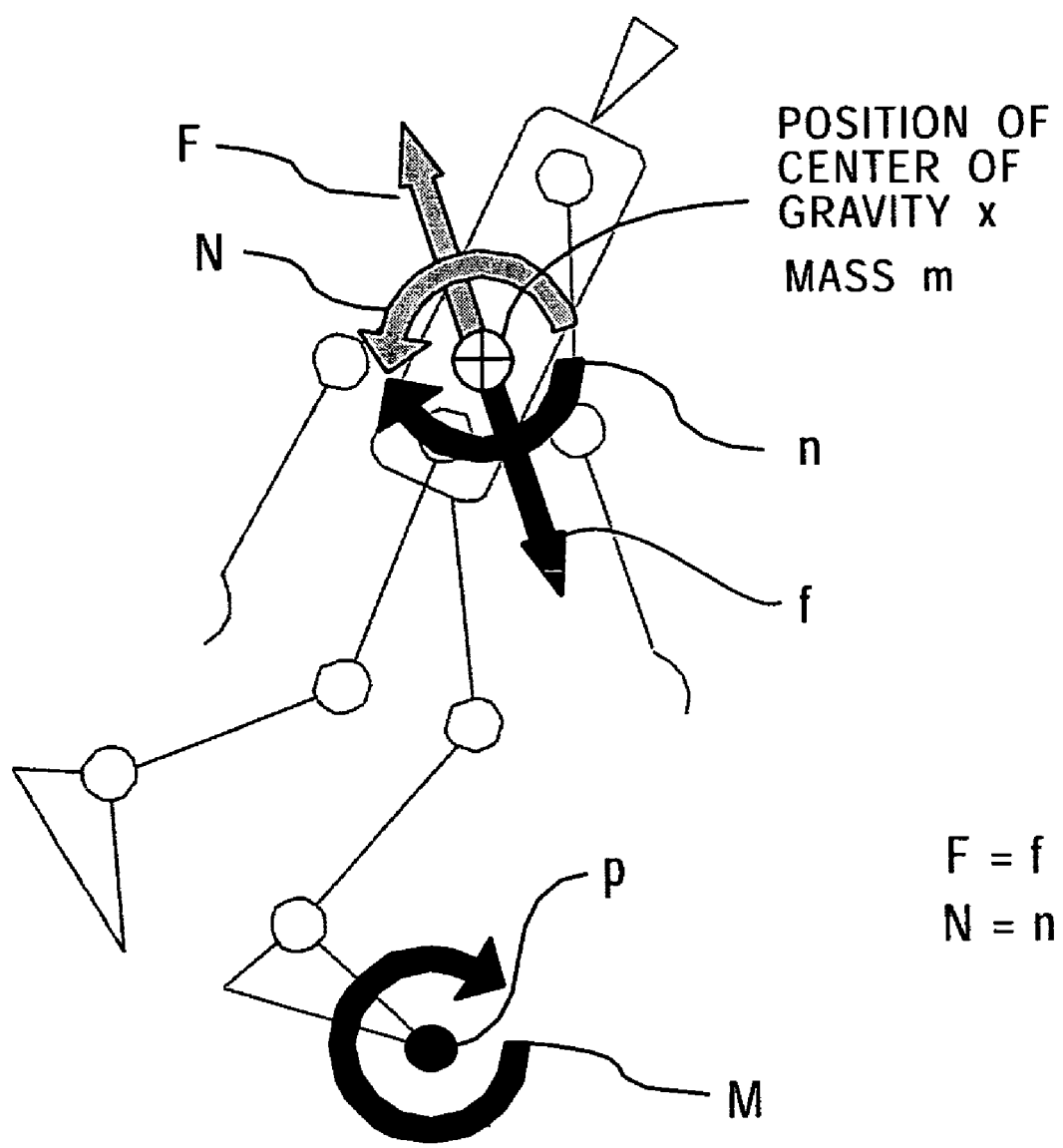
FIG. 2 shows a state in which a constraint (dynamic constraint) is imposed upon a force f and a moment n which a motion pattern produces so that a combination of an external force F (=f) and an external moment (N=n) exists.

Creating a robot motion pattern at random does not cause the robot to move as planned. It can move as planned only when a force $f=(f_x, f_y, f_z)^T$ and a moment $n=(n_x, n_y, n_z)^T$ which a motion pattern is trying to provide are set to provide reaction against the actual environment. In other words, it is necessary to impose constraints on the force f and the moment n that the motion pattern is trying to produce so that F=f and N=n (see FIG. 2).

In the specification, such constraints concerning dynamic equilibrium are called "dynamic constraints." On the other hand, conditions for manifestly imposing positional and temporal constraints, such as on the feet end trajectories, are called "geometrical constraints."

As mentioned above, it is known that the dynamic constraint when the robot is in contact with a plane surface is equivalent to "a ZMP existing within a contact polygon." In other words, when any point $p=(p_x, p_y, p_z)^T$ exists within the contact polygon in an inertial coordinate system, and a moment generated around the point p is $M=(M_x, M_y, M_z)^T$, the dynamic constraint is provided by the following formula:

$$M_x=M_y=0 \tag{1}$$

As described later, the dynamic constraint represented by the equation above can be converted to one using the force f and the moment n that a motion pattern is trying to generate.

On the other hand, when the robot is not in contact with the plane surface, since no external force or external moment is provided from the environment, dynamic constraints are provided by the following formulas:

$$f=0 \tag{2}$$

$$n=0 \tag{3}$$

In the embodiment, by setting algorithms for calculating a motion pattern of the whole body in real time so that Formula (1) is established for a floor contact period and Formulas (2) and (3) are established for a floor non-contact period, a control system which can allow the legged mobile robot to walk, run, hop, and jump freely is realized. Hereunder, in the specification, an example in which the position of the center of gravity of the robot is manipulated in order to satisfy Formulas (1) and (2) and in which the orientation of the main body (pelvis) of the robot is manipulated in order to satisfy Formula (3) will be described.

Figure 3:
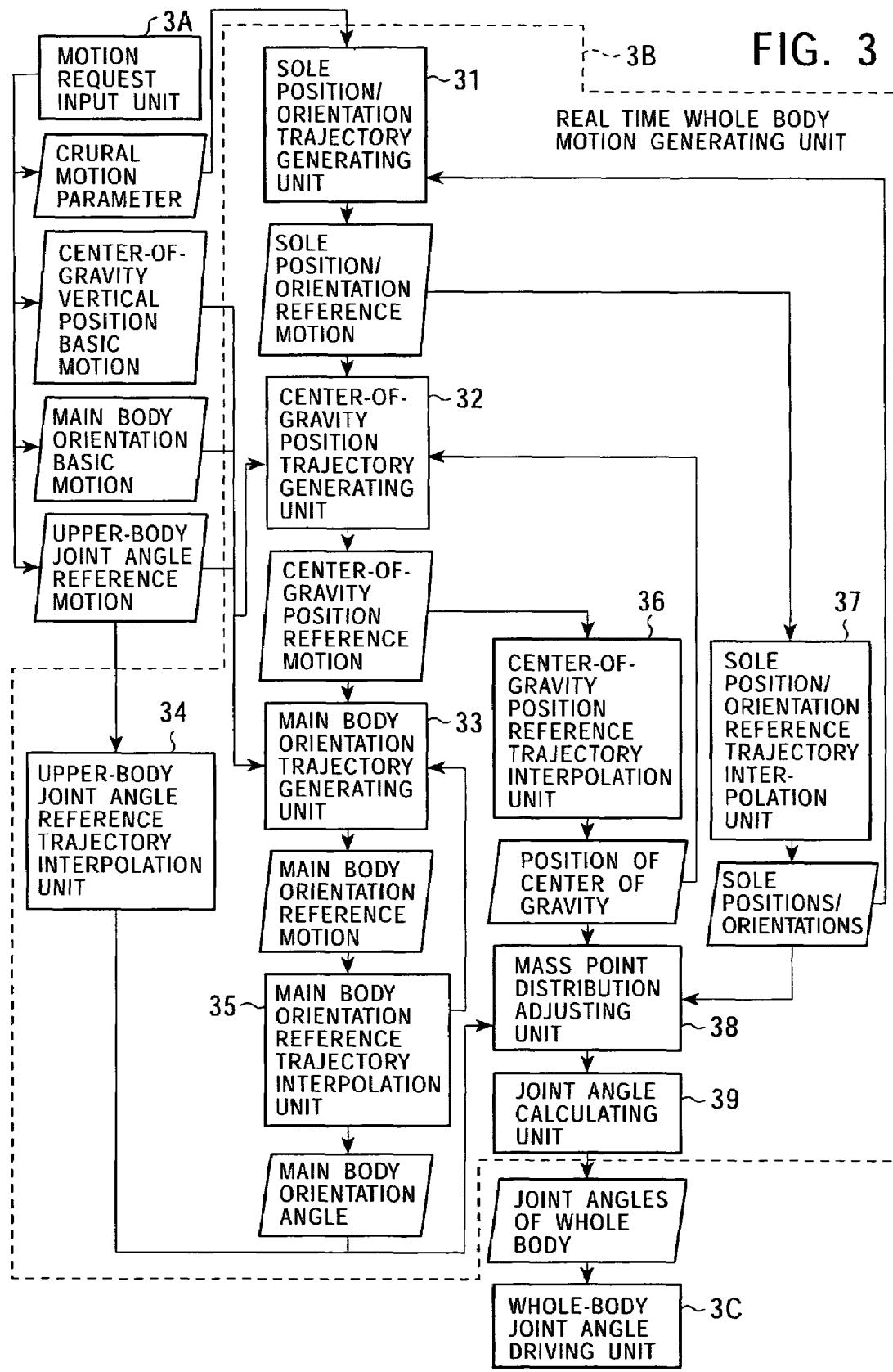
FIG. 3 is a schematic view of a functions structure of a control system of the legged mobile robot of the embodiment of the present invention.

FIG. 3 is a schematic view of a functions structure of the legged mobile robot of the embodiment of the present invention. As shown in the figure, the control system comprises a motion request input unit 3A, a real-time whole-body motion generating unit 3B, and a whole-body joint driving unit 3C.

The real-time whole-body motion generating unit 3B comprises a sole position/orientation trajectory generating unit 31, a center-of-gravity position trajectory generating unit 32, a main body orientation trajectory generating unit 33, trajectory interpolation units (more specifically, an upper-body joint angle reference trajectory interpolation unit 34, a main body orientation reference trajectory interpolation unit 35, a center-of-gravity position reference trajectory interpolation unit 36, and a sole position/orientation reference trajectory interpolation unit 37), a mass point distribution adjusting unit 38, and a joint angle calculating unit 39.

A motion request regarding the upper body (arm joints/waist joints) (upper-body joint angle reference trajectory), a motion request regarding an orientation angle of the main body (pelvis) (main body orientation basic trajectory), a motion request regarding a center-of-gravity vertical position trajectory (center-of-gravity vertical position basic trajectory), and crural motion parameters, such as footstep, motion period, angle of traverse, and time at which robot apparatus is the legs are lifted from a floor, are input by the motion request input unit 3A and output to the real-time whole body motion generating unit 3B. These requests and parameters are constantly determined by a user program (or other means that is not shown).

The real-time whole-body motion generating unit 3B can smoothly change a present motion state to another motion state while dynamically maintaining balance based on the dynamic constraints, determines the robot motion state of a next time capable of satisfying requests for changing the upper-body and crural motions from the user program, and outputs the determined motion state as joint angle reference values of the whole body.

In order to achieve the joint angle reference values output from the real-time whole-body motion generating unit 3B, the whole-body joint driving unit 3C operates so that the actuator motors defining the degrees of freedom of the joints of the whole body are driven by a servo controller (not shown).

Based on the crural motion parameters input by the motion request input unit 3A, the sole position/orientation trajectory generating unit 31 in the real-time whole-body motion generating unit 3B calculates the position/orientation trajectories of the left and right soles for a few steps ahead from the current positions and orientations of the soles.

The center-of-gravity position trajectory generating unit 32 calculates a center-of-gravity position trajectory which, while maximally reflecting the center-of-gravity vertical position basic trajectory input by the motion request input unit 3A, smoothly connects to a current center-of-gravity position trajectory and which is such as to satisfy the aforementioned Formula (1) representing a dynamic constraint for a floor contact period and the aforementioned Formula (2) representing a dynamic constraint for a floor non-contact period.

The main body orientation trajectory generating unit 33 calculates a main body orientation angular trajectory which, while maximally reflecting the main body orientation basic trajectory input by the motion request unit 3A, smoothly connects to a current main body orientation trajectory and which is such as to satisfy the aforementioned Formula (3) representing a dynamic constraint for a floor non-contact period in addition to the aforementioned Formulas (1) and (2) representing dynamic constraints for the aforementioned center-of-gravity position trajectory in the floor contact and floor non-contact periods.

The trajectory interpolation units (the upper-body joint angle reference trajectory interpolation unit 34, the main body orientation reference trajectory interpolation unit 35, the center-of-gravity position reference trajectory interpolation unit 36, and the sole position/orientation reference trajectory interpolation unit 37) perform interpolation on the calculated upper-body joint angle reference trajectory, main body orientation reference trajectory, center-of-gravity position reference trajectory, and sole position/orientation reference trajectories, respectively. The mass point distribution adjusting unit 38 which calculates the upper-body joint angles, the main body orientation angle, the position of the center of gravity, the sole positions and orientations of a next time adjusts the mass point distribution of the whole body so as to achieve at the same time the upper-body joint angles, the main body orientation angle, the position of the center of gravity, and the sole positions and orientations.

The joint angle calculating unit 39 determines the joint angles of the legs so as to achieve the main body position of the next time obtained from the mass point distribution adjusting unit 38 and the sole positions and orientations of the next time obtained from the sole position/orientation trajectory generating unit 31. The determination may be executed by, for example, performing a known reverse kinematic calculation after determining the relative positions and orientations of the legs.

Figure 4:
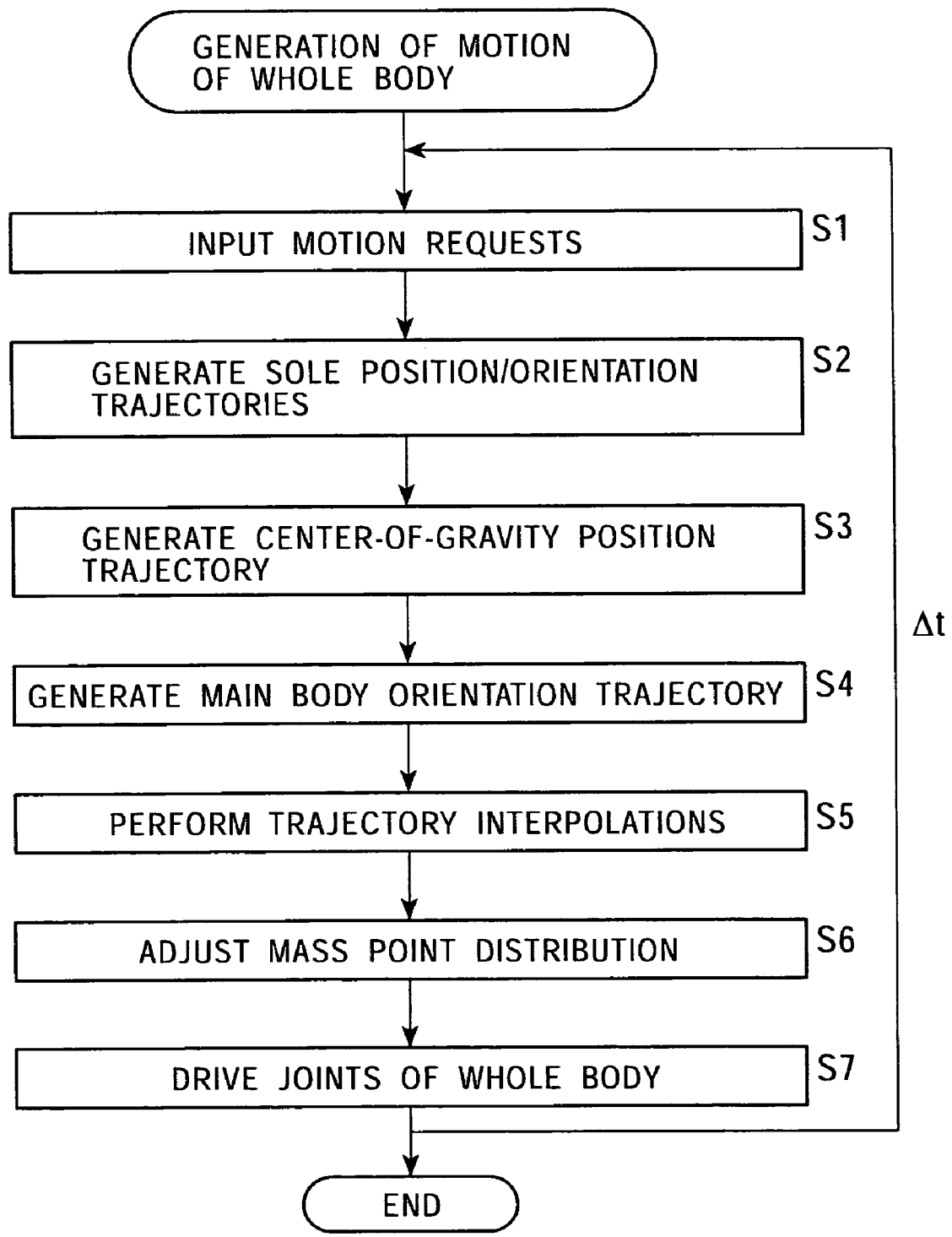
FIG. 4 is a flowchart of the steps executed by the control system shown in FIG. 3.

FIG. 4 is a flowchart of the steps executed by the control system shown in FIG. 3.

When the control system starts operating, a motion request regarding the upper-body joint angles, a motion request regarding the main body orientation, a motion request regarding the position of the center-of-gravity vertical, and a crural motion request are input by the motion request input unit 3A (Step S1).

Then, the sole position/orientation trajectory generating unit 31, the center-of-gravity position trajectory generating unit 32, the main body orientation trajectory generating unit 33 generate sole position/orientation trajectories, a center-of-gravity position trajectory, and a main body orientation trajectory, respectively (Steps S2, S3, and S4).

Next, the trajectory interpolation units (the upper-body joint angle reference trajectory interpolation unit 34, the main body orientation reference trajectory interpolation unit 35, the center-of-gravity position reference trajectory interpolation unit 36, and the sole position/orientation reference trajectory interpolation unit 37) perform interpolation on the upper-body joint angles, the main body orientation angle, the position of the center of gravity, and the positions and orientations of the soles of a next time, respectively (Step S5).

Next, the mass point distribution adjusting unit 38 calculates the joint angles of the whole body (Step S6). Finally, the whole-body joint driving unit 3C drives each joint by a servo controller (Step S7).

The above-described steps are carried out in one period of the control system shown in FIG. 3. The control system executes Step 1 again each time a predetermined control time t (for example, every 10 milliseconds) elapses from the time of completion of the above-described steps.

Next, the functions structure and the operation of the real-time whole body motion generating unit 3B will be described in more detail.

The sole position/orientation trajectory generating unit 31 in the real-time whole-body-motion generating unit 3B determines the position orientation trajectories of the left and right soles for a few steps ahead from current sole positions and orientation states in accordance with crural motion parameters input by the motion request input unit 3A, such as footstep, motion period (walking period, running period, hopping period, etc.), angle of traverse, leg lifting heights, and time at which the legs are lifted from a floor.

Figure 5:
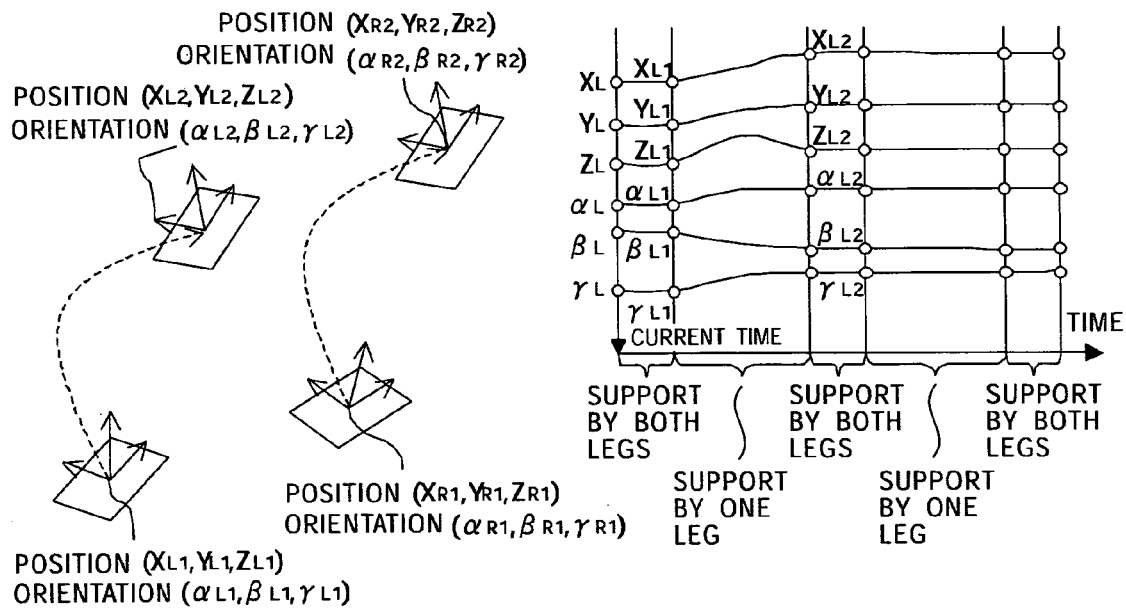
FIG. 5 shows examples of sole positions/orientation trajectories.

FIG. 5 shows examples of sole position/orientation trajectories. As shown in FIG. 5, in the sole position orientation trajectories, the positions of the soles are defined by coordinate positions (x, y, and z), and the orientations are defined by, for example, Euler angles ($\alpha$, $\beta$, and $\gamma$). The sole position orientation trajectories formed by generating a time series by performing, for example, polynomial interpolations for respective parameters for the left and right soles so that the aforementioned crural motion parameters are satisfied.

For example, if a left sole position orientation is represented by ($x_L$, $y_L$, and $z_L$, $\alpha_L$, $\beta_L$, $\gamma_L$), and a current left sole position orientation is represented by ($x_{L1}$, $y_{L1}$, $z_{L1}$, $\alpha_{L1}$, $\beta_{L1}$, $\gamma_{L1}$), a next floor contact start position/orientation ($x_{L2}$, $y_{L2}$, $z_{L2}$, $\alpha_{L2}$, $\beta_{L2}$, $\gamma_{L2}$) is determined by the crural motion parameters such as footstep, motion period, and angle of traverse; and left sole position orientation trajectories therebetween are defined by the following interpolation formulas used for the respective positions and orientations:

$$x_L = x_L(t; x_{L1}, x_{L2})$$

$$y_L = y_L(t; y_{L1}, y_{L2})$$

$$z_L = z_L(t; z_{L1}, z_{L2})$$

$$\alpha_L = \alpha_L(t; \alpha_{L1}, \alpha_{L2}) \quad (4)$$

$$\beta_L = \beta_L(t; \beta_{L1}, \beta_{L2})$$

$$\gamma_L = \gamma_L(t; \gamma_{L1}, \gamma_{L2})$$

For example, polynomials of degree 5 may be used for the interpolation formulas. The sole positions and orientations of the second step and onwards are assumed as being continuations of the same crural motion requests of the first step, and are, thus, defined by similar interpolation formulas. The right sole position/orientation trajectory is similarly defined.

The center-of-gravity position trajectory generating unit 32 calculates a center-of-gravity horizontal trajectory so that the dynamic constraint represented by the aforementioned Formula (1) is satisfied in a floor contact period and the dynamic constraint represented by the aforementioned Formula (2) is satisfied in a floor non-contact period. Hereunder, the center-of-gravity position trajectory generating unit 32 will be described in terms of specific methods of forming constraint formulas for a floor contact period and a floor non-contact period and a method for calculating a center-of-gravity position trajectory which satisfy both constraint formulas.

In the floor contact period, any point $p = (p_x, p_y, \text{and } p_z)^T$ exists in an inertial coordinate system, and the moment M is generated around this point p. The gravitational acceleration vector is expressed as $-g = (0, 0, -g)^T$. From the equilibrium condition regarding the moment around the point p, the following formula is established:

$$M = n + (x - p) \times f \quad (5)$$

From a center-of-gravity translational motion formula, the following formula is established:

$$m\ddot{x} = f - mg \quad (6)$$

If the force f applied to the coordinate position x (x, y, and z) in each of the Formulas (5) and (6) is eliminated, the following formula is established:

$$M = (x - p) \times m(\ddot{x} + g) + n \quad (7)$$

Here, if the point p is ZMP, the horizontal axis moment becomes zero, so that the following formula is established:

$$\begin{bmatrix} 0 \\ 0 \\ * \end{bmatrix} = (x - p) \times m(\ddot{x} + g) + n \quad (8)$$

In general, the moment generated around the ZMP is predominantly due to the motion of the center of gravity. Therefore, if the second right term in Formula (8) above is eliminated, and the first and the second terms are expanded, the following ZMP formula regarding the center-of-gravity motion is established:

$$(z - p_z)\ddot{x} - (x - p_x)(\ddot{z} + g) = 0$$

$$(z - p_z)\ddot{y} - (y - p_y)(\ddot{z} + g) = 0 \quad (9)$$

Although Formula (9) above is simple, it is a differential equation of variable coefficients of x and y. Therefore, it cannot be easily solved. Consequently, in the embodiment, the following approximations are assumed to be true for a relatively short time interval T:
(Assumption 1) There is no acceleration in a ZMP trajectory.
(Assumption 2) The center-of-gravity height is constant.
(Assumption 3) The external moment is constant.

If these assumptions are true, the ZMP Formula (9) becomes the following simple normal differential equation:

$$m(Z\ddot{X} - gX) = 0 \quad (10)$$

Formula (10) above is only for the x component, with the following formulas being satisfied.

$$X = x - p_x \quad (11)$$

$$Z = z - p_z = \text{const} \quad (12)$$

The general solutions to the normal differential Formula (10) are as follows:

$$x = p_x + C_1 \exp(\lambda t) + C_2 \exp(-\lambda t)$$

$$\dot{x} = \dot{p}_x + \lambda \{C_1 \exp(\lambda t) - C_2 \exp(-\lambda t)\} \quad (13)$$

However, $\lambda$ is a proper value expressed as follows:

$$\lambda = \sqrt{g/Z} \quad (14)$$

If boundary values of Formula (13) above are considered, the following holds true:

$$x(0) = p_x(0) + C_1 + C_2$$

$$\dot{x}(0) = \dot{p}_x(0) + \lambda(C_1 - C_2)$$

$$x(T) = p_x(T) + C_1 \exp(\lambda T) + C_2 \exp(-\lambda T) \quad (15)$$

$$\dot{x}(T) = \dot{p}_x(T) + \lambda\{C_1 \exp(T) - C_2 \exp(-\lambda T)\}$$

Figure 6:
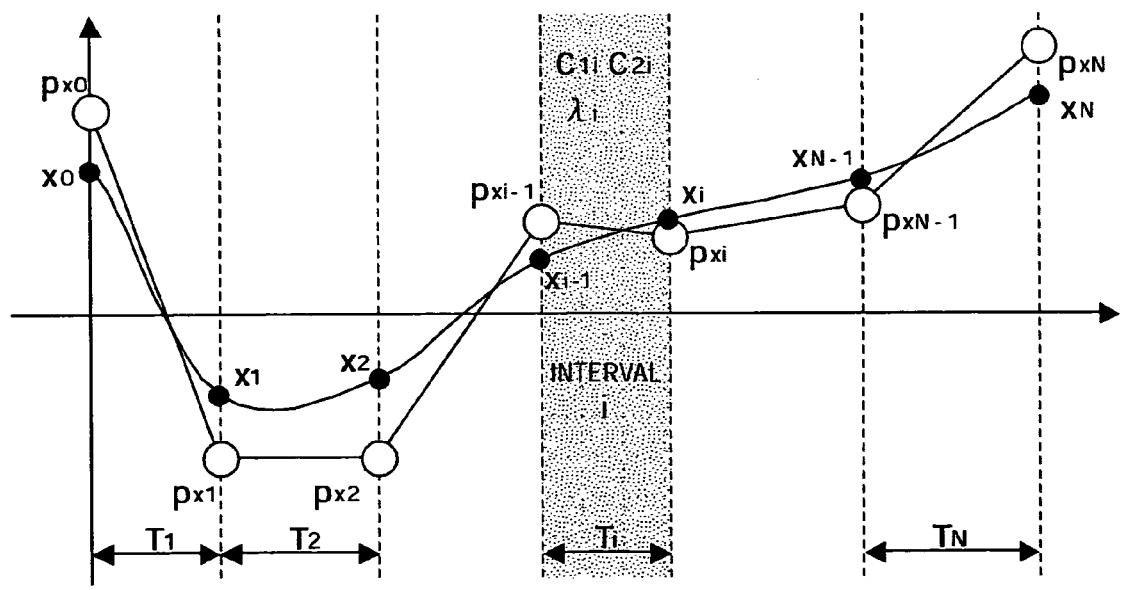
FIG. 6 shows a state in which short intervals are consecutively set for N intervals.

In the embodiment, the general motion of the legged mobile robot having a plurality of consecutive short intervals satisfying the aforementioned Assumptions 1 to 3 is used as a model. FIG. 6 shows a state in which short intervals are consecutively set for N intervals.

When the time width of an ith interval i is represented by Ti, undetermined coefficients are represented by $C_{1i}$ and $C_{2i}$, the proper value is represented by $\lambda_i$, the ZMP position at a termination end of the interval i is represented by $p_{xi}$, and the center-of-gravity position is represented by $x_i$, Formula (15) above providing the above-described boundary conditions is expressed as follows in a general interval i:

$$x_{i-1} = p_{xi-1} + C_{1i} + C_{2i}$$

$$\dot{x}_{i-1} = \dot{p}_{xi-1} + \lambda_i(C_{1i} - C_{2i})$$

$$x_i = p_{xi} + C_{1i} \exp(\lambda_i T_i) + C_{2i} \exp(-\lambda_i T_i) \quad (16)$$

$$\dot{x}_i = \dot{p}_{xi} + \lambda_i \{C_{1i} \exp(\lambda_i T_i) - C_{2i} \exp(-\lambda_i T_i)\}$$

In contrast, for a short interval in a floor non-contact period, since a horizontal external force is not exerted, the motion at a center-of-gravity horizontal position (x and y) is predominantly determined by the following simple motion formula. For simplicity, only the formula for the x direction is given.

$$m\ddot{x} = 0 \quad (17)$$

Integrating Formula (17) results in the following:

$$x = C_1 + C_2 t \quad (18)$$

Here, when boundary conditions are considered, the following results:

$$x(0) = C_1$$

$$\dot{x}(0) = C_2$$

$$x(T) = C_1 + C_2 T \quad (19)$$

$$\dot{x}(T) = C_2$$

Figure 7:
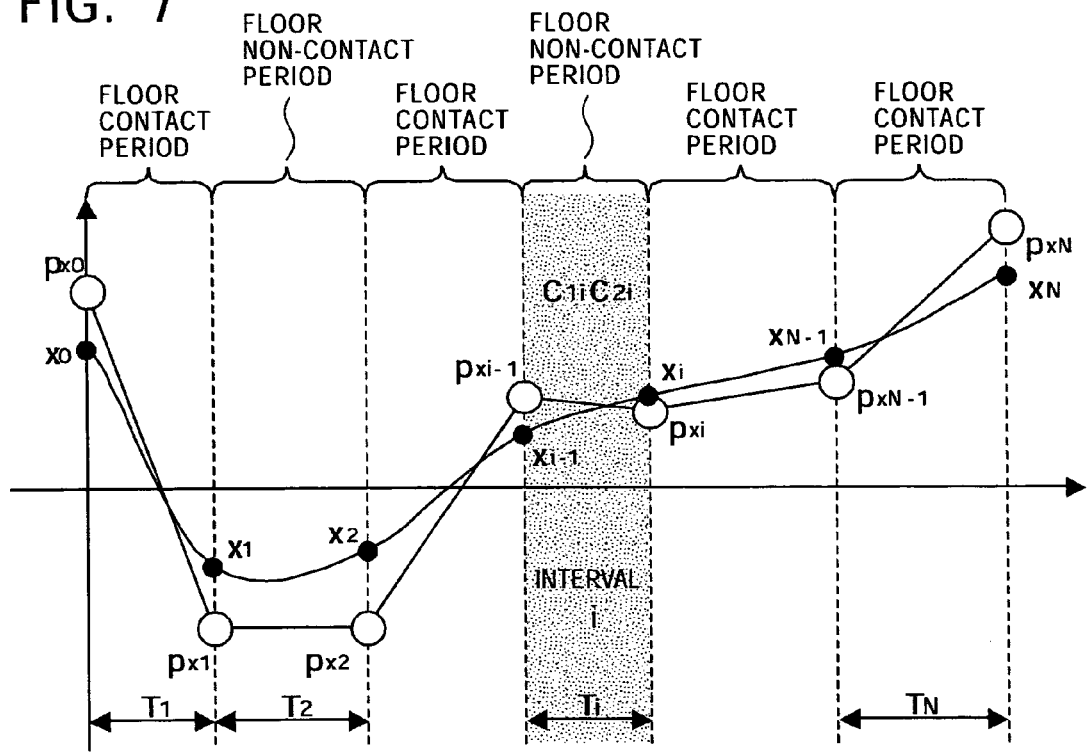
FIG. 7 shows a state in which short intervals of floor contact periods and short intervals of floor non-contact periods exist in the model in which short intervals are consecutively set for N intervals.

Although the model in which short intervals are set consecutively for N intervals in floor contact periods has used, short intervals may be set consecutively in floor contact periods and floor non-contact periods as shown in FIG. 7.

When a short interval i exists in a floor non-contact period, its boundary conditions differ from those in the floor contact period. Based on Formula (19), the following results:

$$x_{i-1} = C_{1i}$$

$$\dot{x}_{i-1} = C_{2i}$$

$$x_i = C_{1i} + C_{2i} T \quad (20)$$

$$\dot{x}_i = C_{2i}$$

For a motion having a floor contact period and a floor non-contact period, the undetermined coefficients must be determined so that these boundary conditions are such that the positions and speeds are connected. The conditions of continuity for the positions and speeds at the boundaries of an interval i−1 and the interval i depend upon the types of adjacent short intervals:

(1) When the interval i−1 is in the floor contact period and the interval i is in the floor non-contact period, from Formula (16) above, the conditions for making $x_i$ and the speed component $dx_i/dt$ as seen from the interval i−1 equal to those as seen from the interval i are as follows:

$$C_{1i} + C_{2i} = C_{1i-1} \exp(\lambda_{i-1} T_{i-1}) + C_{2i-1} \exp(-\lambda_{i-1} T_{i-1}) \quad (21)$$

$$\frac{p_{xi} - p_{xi-1}}{T_i} + \lambda_i(C_{1i} - C_{2i}) = \frac{p_{xi-1} - p_{xi-2}}{T_{i-1}} + \quad (22)$$

$$\lambda_{i-1}\{C_{1i-1} \exp(\lambda_{i-1} T_{i-1}) - C_{2i-1} \exp(-\lambda_{i-1} T_{i-1})\}$$

(2) When the interval i−1 is in the floor non-contact period and the interval i is in the floor contact period, from Formulas (16) and (20) above, the conditions for making $x_i$ and the speed component $dx_i/dt$ as seen from the interval i−1 equal to those as seen from the interval i are as follows:

$$p_{xi-1} + C_{1i} + C_{2i} = C_{1i-1} + C_{2i-1} T_{i-1} \quad (23)$$

$$\frac{p_{xi} - p_{xi-1}}{T_i} + \lambda_i(C_{1i} - C_{2i}) = C_{2i-1} \quad (24)$$

(3) When the interval i−1 is in the floor contact period and the interval i is in the floor non-contact period, from Formulas (16) and (20) above, the conditions for making $x_i$ and the speed component $dx_i/dt$ as seen from the interval i−1 equal to those as seen from the interval i are as follows:

$$C_{1i} = p_{xi-1} + C_{1i-1} \exp(\lambda_{i-1} T_{i-1}) + C_{2i-1} \exp(-\lambda_{i-1} T_{i-1}) \quad (25)$$

$$C_{2i} = \frac{p_{xi-1} - p_{xi-2}}{T_{i-1}} + \quad (26)$$

$$\lambda_{i-1}\{C_{1i-1} \exp(\lambda_{i-1} T_{i-1}) - C_{2i-1} \exp(-\lambda_{i-1} T_{i-1})\}$$

(4) When the interval i−1 is in the floor non-contact period and the interval i is in the floor non-contact period, from Formula (20) above, the conditions for making $x_i$ and the speed component $dx_i/dt$ as seen from the interval i−1 equal to those as seen from the interval i are as follows:

$$C_{1i} = C_{1i-1} + C_{2i-1} T_{i-1} \quad (27)$$

$$C_{2i} = C_{2i-1} \quad (28)$$

The conditions of continuity of the position and speed at the boundary of the short intervals above also hold at boundaries of short intervals i=2 . . . N. Boundary conditions for achieving the given center-of-gravity position and speed are also imposed even at the starting end of the entire motion interval. For a formula allowing a mixture of floor non-contact period intervals and floor contact period intervals, the boundary conditions that must be met depend upon whether an interval 0 is in a floor non-contact period or a floor contact period as follows:

(1) When the interval 0 is in the floor contact period, from Formula (16) above, the starting end of the interval 0 is such that the following formulas are satisfied:

$$C_{1_1} + C_{2_1} + p_{x0} = \bar{x}_0 \quad (29)$$

$$\frac{p_{x1} - p_{x0}}{T_1} + \lambda_1(C_{1_1} - C_{2_1}) = \dot{\bar{x}}_0 \quad (30)$$

(2) When the interval 0 is in the floor non-contact period, from Formula (20) above, the starting end of the interval 0 is such that the following formulas are satisfied:

$$C_{1_1} = \bar{x}_0 \quad (31)$$

$$C_{2_1} = \dot{\bar{x}}_0 \quad (32)$$

Similarly, at a termination point of the interval N, boundary conditions for achieving the given center-of-gravity position and speed must be satisfied as a termination end condition of the whole motion period. The boundary conditions that must be satisfied depend upon whether or not the interval N is in the floor non-contact period or the floor contact period as follows:

(1) When the interval N is in the floor contact period, from Formula (16) above, the termination end of the interval N is such that the following formulas are satisfied:

$$p_{x_N} + C_{1_N}\exp(\lambda_{iN}T_N) + C_{2_N}\exp(\lambda_N T_N) = \bar{x}_N \qquad (33)$$

$$\frac{p_{x_N} - p_{x_{N-1}}}{T_N} + \lambda_N\{C_{1_N}\exp(\lambda_N T_N) - C_{2_N}\exp(-\lambda_N T_N)\} = \dot{\bar{x}}_N \qquad (34)$$

(2) When the interval N is in the floor contact period, from Formula (20) above, the termination end of the interval N is such that the following formulas are satisfied:

$$C_{1_N} + C_{2_N}T_N = \bar{x}_N \qquad (35)$$

$$C_{2_N} = \dot{\bar{x}}_N \qquad (36)$$

The position and speed of the center of gravity based on the conditions for the starting end are replaced by a current position and a current speed of the center of gravity in order to obtain a center-of-gravity position trajectory that smoothly connects to a current motion state. For the center-of-gravity position based on the conditions for the termination end, the central positions of both soles, etc., are set based on the positions of both soles at the motion termination end. Assuming that the center of gravity is stopped at the center-of-gravity position, for example, zero is set for the speed of the center of gravity at the termination end. This imposes a constraint on the solutions of the motion equation so that, after the passage of a certain time period, the center of gravity comes directly above the centers of both soles.

In generating a real-time motion pattern, since re-planning of generating a motion pattern is repeated at a relatively short period of time (for example, each time a control period elapses), it is sufficient to achieve a stable motion state within a very short period of time until the next re-planning. Therefore, it is possible to obtain solutions of sufficient practical precision even if the conditions for reaching the termination end that is sufficiently separated from the current time are only approximations as described above.

The boundary of short intervals is set as, for example, the boundary of a period in which the robot is supported by both legs and a period in which the robot is supported by one leg, or the boundary of a floor contact period and a floor non-contact period.

Formulas (21) to (36) above imposes 2N+2 constraints at the boundaries of the N short intervals that are successively set. There are various methods of setting variables other than the undetermined coefficients $C_{1i}$ and $C_{2i}$ (i=1 ... N). In the embodiment, $p_{xi}$ (i=1 ... N) are added as a variable. If at least one floor contact period exists, there are at least two ZMP positions $p_{xi}$, so that the number of variables is 2N+2, thereby making it possible to obtain solutions.

In general, there are at least two floor contact period intervals among the successively set intervals. Therefore, there are too many variables. Consequently, optimization is carried out. For example, when a secondary plan problem with an equality constraint for minimizing the difference (see formula below) between the ZMP position $p_{xi}$ at the boundary of a floor contact period and a stable area center (center of gravity at polygon in the floor contact period) under the equality constraints given by Formulas (21) to (36) is solved, these undetermined variables can be uniquely set.

$$\min \Sigma(p_{xi} - \bar{p}_{xi})^2 \qquad (37)$$

Alternatively, Formulas (21) to (36) above may be solved as simultaneous linear equations in 2N+2 unknowns, with the ZMP positions other than two particular nodes $p_{xj}$ and $p_{xk}$ (j, k ∈ [o, N]) at the boundary of the floor contact period being fixed and only $p_{xj}$ and $p_{xk}$ being set as variables. If the undetermined variables are determined, the center-of-gravity horizontal position at any time in the planned motion period can be calculated using Formula (13) above for the floor contact period and Formula (18) for the floor non-contact period.

This means that a center-of-gravity horizontal position trajectory is obtained by the above. A center-of-gravity vertical position trajectory must be generated so as to meet a dynamic constraint. As long as $f_z>0$ in a floor contact period, the center-of-gravity vertical motion is not particularly dynamically constrained. In contrast, it is dynamically constrained when $f_z=0$ in a floor non-contact period. More specifically, when $f_z=0$ in Formula (6) above, the Z component is obtained by:

$$m\ddot{z} = -mg \qquad (38)$$

When Formula (38) above is integrated, it becomes:

$$z = -\frac{1}{2}gt^2 + K_1 t + K_2 \qquad (39)$$

When the time at which the legs of the robot are lifted from the floor is T, and the undetermined coefficients are set as a center-of-gravity vertical position $z_1$ at a floor non-contact start time and a center-of-gravity vertical position $z_2$ at a floor contact start time, the center-of-gravity vertical position trajectory of the robot is obtained as a free fall curve defined by the following formulas:

$$z = -\frac{1}{2}gt^2 + \left(\frac{z_2 - z_1}{T} + \frac{1}{2}gT\right)t + z_1 \qquad (40)$$

$$\dot{z} = -gt + \left(\frac{z_2 - z_1}{T} + \frac{1}{2}gT\right) \qquad (41)$$

For the center-of-gravity vertical position $z_1$ at the floor non-contact start time and the center-of-gravity vertical position $z_2$ at the floor contact start time, values of a center-of-gravity vertical position basic trajectory at the starting end and the termination end of the floor non-contact period input from the motion request input unit 3A are used.

Here, the center-of-gravity vertical position trajectory input by the user program is called "basic trajectory" because the final center-of-gravity vertical position reference trajectory is different due to corrections made to satisfy the aforementioned dynamic constraints. In other words, the basic trajectory is a general trajectory previously set by a user. Hereunder, in the specification, the term "basic trajectory" means a trajectory which is maximally reflected, but is to be corrected to satisfy the dynamic constraints.

The center-of-gravity vertical position trajectory is set at each floor non-contact period by Formula (40) above. If the dynamic constraints are not particularly imposed upon the center-of-gravity vertical position trajectory at a floor contact period, but the floor contact period is adjacent to a floor non-contact period, the center-of-gravity position basic trajectory in the floor contact period must be corrected so as to smoothly connect to the center-of-gravity vertical position trajectory obtained by Formula (40) at the boundary of the floor non-contact period and the floor contact period. In other words, the center-of-gravity vertical motion state at the non-contact start time has the following value with t=0 in Formulas (40) and (41).

$$z = z_1, \dot{z} = \dot{z}_1 = \left(\frac{z_2 - z_1}{T} + \frac{1}{2}gT\right) \quad (42)$$

Therefore, for a smooth connection, the center-of-gravity vertical position basic trajectory in the floor contact period immediately preceding the floor non-contact period must be corrected. The floor contact period including the interval i−1 in FIG. 8 corresponds to such a case.

Figure 8:
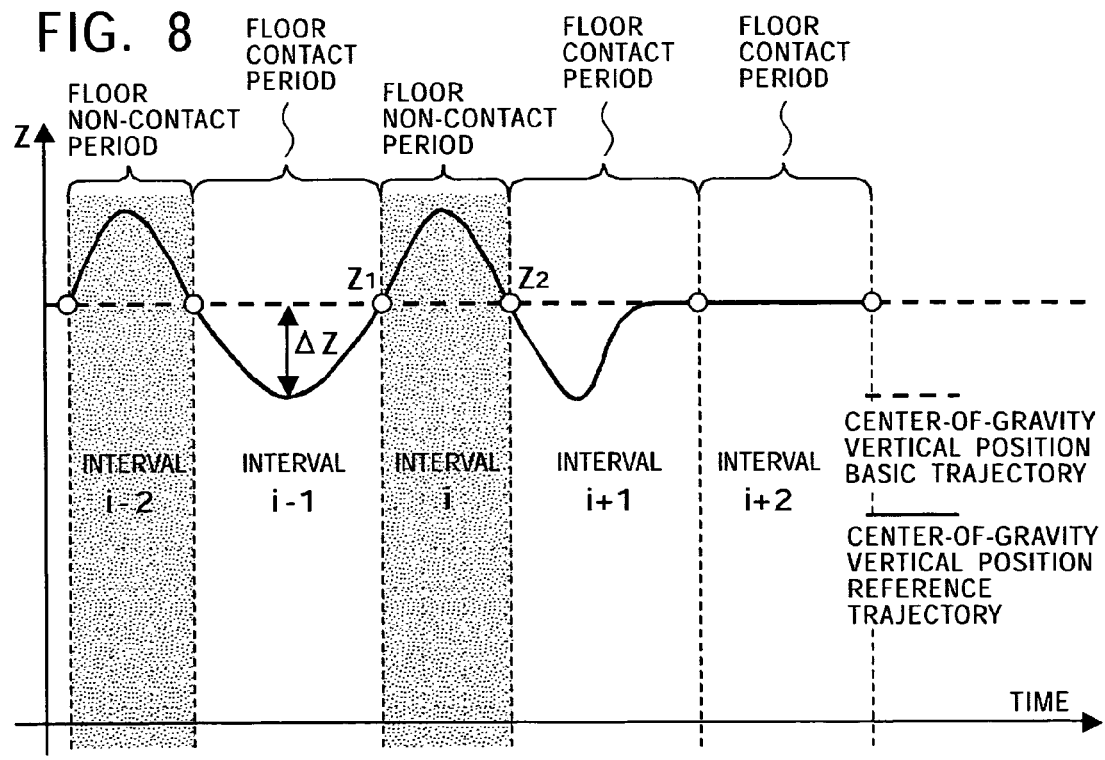
FIG. 8 shows the relationship between a center-of-gravity position basic trajectory and a center-of-gravity position reference trajectory in the model in which short intervals and short intervals of floor non-contact periods exist.

The interval i−1 shown in FIG. 8 is disposed between floor non-contact periods. A curved trajectory which satisfies the boundary condition of Formula (42) above must be set at the boundary of the interval i−1 and an interval i−2 (starting end) in addition to the boundary of the interval i−1 and the interval i (termination end).

The center-of-gravity vertical position trajectory between floor contact periods can be set as a curved trajectory so as to satisfy the starting end and termination end conditions by, for example, polynomial interpolation. Alternatively, if necessary, a curve may be formed so that a minimum value is not reduced from the basic trajectory by an amount greater than a center-of-gravity sinking depth $\Delta_z$ for the floor contact start time/non-contact start time included as a crural motion parameter; interpolation may be performed using a special curve not including an inflection point; or a spring/damper system response curve may be used.

Similarly, the center-of-gravity vertical motion state at the contact start time has the following value with t=0 in Formulas (40) and (41).

$$z = z_2, \dot{z} = \dot{z}_2 = \left(\frac{z_2 - z_1}{T} - \frac{1}{2}gT\right) \quad (43)$$

Therefore, for a smooth connection, the center-of-gravity vertical position basic trajectory in a floor contact period immediately following a floor non-contact period must be corrected. The interval i+1 in FIG. 8 corresponds to such a case.

Unlike the interval i−1, an end of the interval i+1 in FIG. 8 is connected to a floor contact period interval i+2. In this case, the center-of-gravity vertical position trajectory of the interval i is set so that the boundary of the interval i+1 and the interval i (starting end) satisfies the boundary condition of Formula (43) above and the boundary of the interval i+1 and the interval i+2 (termination end) is such that the position and speed are continuous with the position and the speed of the center-of-gravity vertical position basic trajectory.

As in the case in which a floor contact period directly precedes a floor non-contact period, a curved trajectory may be set so as to satisfy such starting end and termination end conditions by, for example, polynomial interpolation. Alternatively, if necessary, a curve may be formed so that a minimum value is not reduced from the basic trajectory by an amount greater than a center-of-gravity sinking depth $\Delta_z$ for the floor contact start time/non-contact start time included as a crural motion parameter; interpolation may be performed using a special curve not including an inflection point while eliminating accidental vibration; or a spring/damper system response curve may be used.

For a center-of-gravity vertical position trajectory in a floor contact period that is not adjacent to a floor non-contact period, the center-of-gravity vertical position basic trajectory is used as a reference trajectory. Similarly, for a center-of-gravity vertical position trajectory in a floor contact period which is adjacent to a floor non-contact period, the entire trajectory in the entire floor contact period does not necessarily have to be a correction of the basic trajectory. In such a case, the trajectory may be partly corrected, for example, immediately before or after the floor non-contact start time or the floor contact start time.

Figure 9:
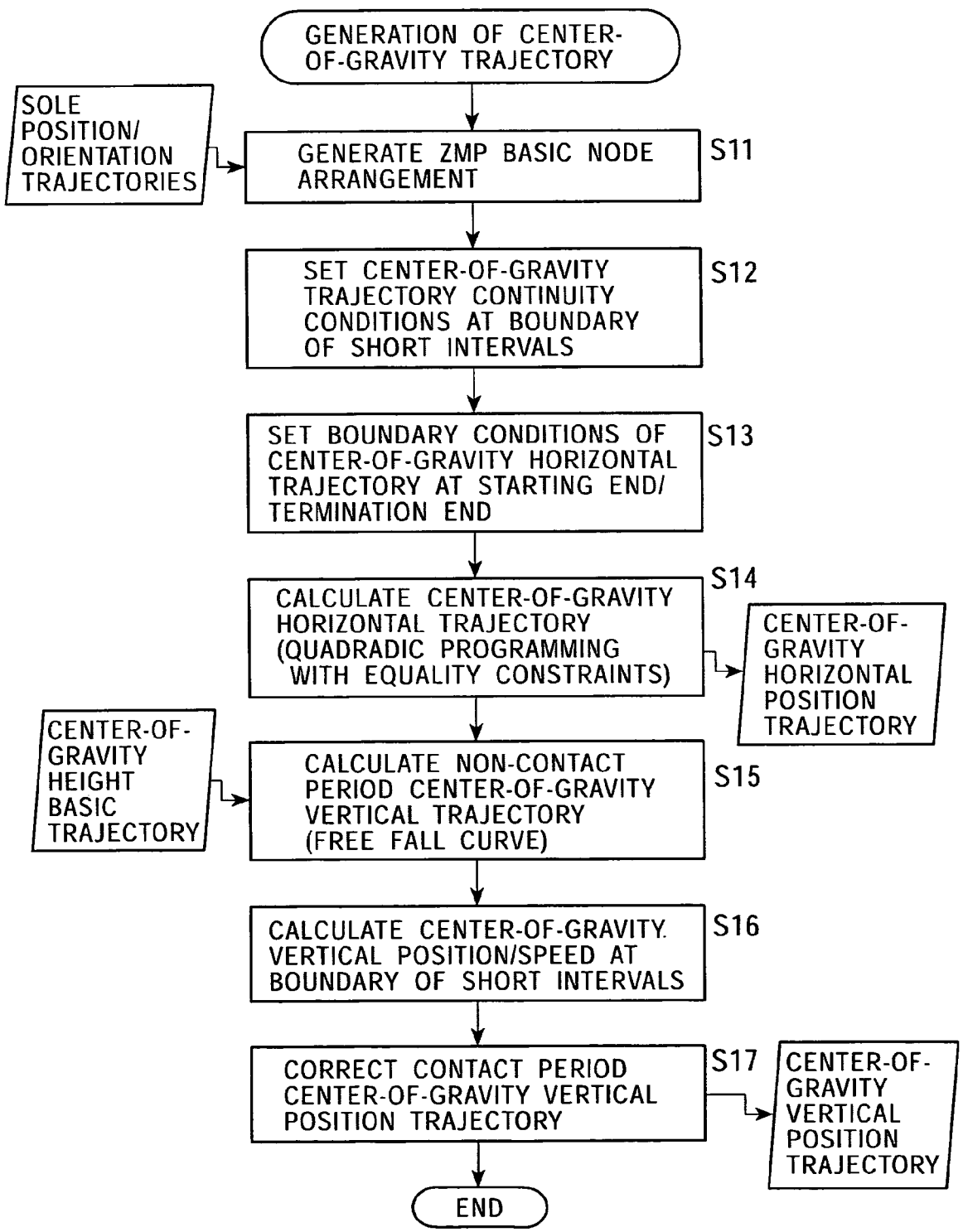
FIG. 9 is a flowchart of the steps executed by a center-of-gravity position trajectory generating unit 32.

In this way, the center-of-gravity position trajectory generating unit 32 generates a center-of-gravity position trajectory so as to satisfy Formula (1) providing a dynamic constraint in a floor contact period and Formula (2) providing a dynamic constraint in a floor non-contact period. FIG. 9 is a flowchart of the steps executed by the center-of-gravity position trajectory generating unit 32.

First, in a ZMP basic node generation, the arrangement of basic ZMP positions at the boundaries of the short intervals is generated so that a ZMP trajectory passes near the center of the stable area (the center of gravity of the contact polygon) based on the sole position and orientation reference trajectories produced by the sole position/orientation trajectory generating unit 31 (Step S11)

Each basic ZMP position is corrected in the next step of calculating a next center-of-gravity horizontal position trajectory (Step S14), but is reflected so as to be maximally achieved. Here, if a basic ZMP trajectory which passes outside the floor-contact polygon or which greatly deviates from the center of the stable area is set, when the basic ZMP positions are corrected in the step of calculating a next center-of-gravity horizontal position trajectory (Step S14), the ZMPs may be outside the contact polygon, as a result of which the dynamic constraints may not be satisfied. Such a case does not occur frequently. However, if a better system is to be achieved, when a ZMP trajectory which lies outside the contact polygon is obtained, additional operations, such as autonomously correcting the basic ZMP positions or autonomously changing a crural motion parameter, may be carried out.

Next, a step of setting conditions for continuity of a center-of-gravity position trajectory at the boundaries of short intervals are set (Step S12). More specifically, based on Formulas (21) to (28) above, the equality constraints are set in a matrix. As mentioned above, the continuity condition constraint equations depend upon whether adjacent intervals are those of floor contact periods or floor non-contact periods.

Next, center-of-gravity horizontal position trajectory boundary conditions at the starting end and termination end of a motion interval under consideration are set in a matrix (Step S13). The starting end boundary conditions are provided by Formulas (29) to (32) above and the termination end boundary conditions are provided by Formulas (33) to (36) above. Like the conditions of continuity at the short interval boundaries, the constraint equations depend upon whether or not the interval 0 and the interval N are in the floor contact period or the floor non-contact period.

Next, the secondary plan problem with equality constraints set in Steps S12 and S13 (Formula 37) is solved, and the undetermined coefficients $C_{1i}$ and $C_{2i}$ (i=1 ... N) and the ZMP positions $p_{xi}$ (i=1 ... N) are determined.

By such operations, the center-of-gravity horizontal position and speed at any time using Formula (18) above for a floor non-contact period and using Formula (13) above for a floor contact period can be calculated. In other words, the center-of-gravity horizontal position trajectory of any time is obtained.

Next, a step of calculating a center-of-gravity vertical position trajectory at a floor non-contact period is carried out (Step S15). More specifically, based on the center-of-gravity vertical position basic trajectory provided by the user program, coefficients of the quadratic equation represented by Formula (40) above) are determined. Such an operation makes it possible to calculate the position and speed of the center of gravity at any time in the floor non-contact period (including the boundaries).

Next, a step of calculating the vertical position and speed of the center of gravity at a boundary of short periods is carried out (Step S16). The position and speed of the center of gravity at a boundary of a non-contact period are calculated using Formulas (42) and (43) above. For the position and speed of the center of gravity of boundaries other than this boundary, the values of the center-of-gravity vertical position basic trajectory provided by the user program may be used.

Lastly, the center-of-gravity vertical position trajectory at a floor contact period is corrected, so that the formation of a center-of-gravity vertical position trajectory satisfying the dynamic constraints, that is, the center-of-gravity position trajectory is completed (Step S17).

For a floor contact period adjacent to a floor non-contact period, a center-of-gravity vertical position trajectory is formed by a proper curve using, for example, a polynomial formula so as to satisfy the boundary conditions calculated in Step S16. For a floor contact period which is not adjacent to a floor non-contact period, the center-of-gravity vertical position basic trajectory provided by the user program is used as the center-of-gravity vertical position trajectory.

As a result of the above-described operations, by Step S15, the center-of-gravity vertical position trajectory of the floor non-contact period is obtained, and by Step S17 the center-of-gravity vertical position trajectory at the floor contact period is obtained. Therefore, the center-of-gravity vertical position trajectories of all times are obtained.

As can be understood from the foregoing description, a center-of-gravity position trajectory which satisfies the dynamic constraint represented by Formula (1) or (2) is obtained. The remaining dynamic constraint represented by Formula (3) for the floor non-contact period must be separately reflected in regard to the motion plan.

In general, an angular momentum L and an external moment n around the center of gravity have the following relationship:

$$\frac{d}{dt}L = n \qquad (44)$$

In the floor non-contact period, the dynamic constraint represented by Formula (3) must be satisfied. By substituting this into Formula (44) above and integrating it, it can be understood that the resulting formula is equivalent to the law of conservation of angular momentum.

$$L = \text{const} = \overline{L} \qquad (45)$$

In addition to the constraints regarding the sole position/orientation trajectories output from the sole position/orientation trajectory generating unit 31 and regarding the center-of-gravity position trajectory output from the center-of-gravity position trajectory generating unit 32, the motion in the floor non-contact period must be planned so as to satisfy the constraint regarding the angular momentum represented by Formula (45) above. Hereunder, a method of planning the motion of the robot apparatus so as to satisfy the constraint regarding angular momentum will be described in detail.

In general, the state of the robot may be represented by the position and the orientation of the main body (pelvis) and the angles of all the joints. More specifically, if the position of the main body is represented by $p_b = (p_{bx}, p_{by}, p_{bz})^T$, the orientation of the main body (Eulerian angle) is represented by $\alpha_b = (\alpha_{bx}, \alpha_{by}, \alpha_{bz})^T$, the left foot joint angles are represented by $\theta_L = (\theta_{L1}, \theta_{L2}, \theta_{L3}, \theta_{L4}, \theta_{L5}, \theta_{L6})^T$, the right foot joint angles are represented by $\theta_R = (\theta_{R1}, \theta_{R2}, \theta_{R3}, \theta_{R4}, \theta_{R5}, \theta_{R6})^T$, and the upper-body joint angles are represented by $\theta_U = (\theta_{1U}, \ldots, \theta_{NU})$, a robot state variable q can be defined as a vector represented by the following formula in which all these values are arranged. Here, the order of the robot state variable q is $N_q$.

$$q = \begin{bmatrix} p_b \\ \alpha_b \\ \theta_L \\ \theta_R \\ \theta_U \end{bmatrix} \qquad (46)$$

Indices are provided to all of the links, and the link having an index number i is link i. The relationships among the generalized velocities of the robot state variable q, the angular speed and the translational speed of the link i, the center-of-gravity speed of the entire robot, and the angular momentum around the center of gravity are represented using Jacobian J as in Formulas (47), (48), (49), and (50):

$$\alpha_i = J_{\alpha_i} \dot{q} \qquad (47)$$

$$\dot{p}_i = J_{p_i} \dot{q} \qquad (48)$$

$$\dot{x} = J_x \dot{q} \qquad (49)$$

$$L = J_L \dot{q} \qquad (50)$$

Here, each Jacobian J represents a $3 \times N_q$ matrix, and, in general, can be analytically obtained as a function of the current robot state q. If the current state q is known, using these formulas, the constraints concerning the center-of-gravity position trajectory, the sole position/orientation trajectories, and the angular momentum can be represented as follows as constraints regarding the generalized velocities of the robot state. A left sole link index is $i_L$, and a right sole link index is $i_R$.

(1) Constraints Regarding Sole Orientations

Since, in Formula (47) above, the angular speeds of the sole links must be equal to the Eulerian speeds of the left and right feet calculated from the sole trajectories generated by the sole position/orientation trajectory generating unit 31, $$\dot{\alpha}_{i_L} = J_{\omega_{i_L}} \dot{q} = \overline{\dot{\alpha}}_{i_L} \qquad (51)$$

$$\dot{\alpha}_{i_R} = J_{\omega_{i_R}} \dot{q} = \overline{\dot{\alpha}}_{i_R} \qquad (52)$$

(2) Constraints Regarding the Positions of the Ends of the Feet

Since, in Formula (48), the translational speeds of the sole links must be equal to the translation speeds of the left and right feet calculated from the sole trajectories generated by the sole position/orientation trajectory generating unit 31, $$\dot{p}_{i_L} = J_{p_{i_L}} \dot{q} = \overline{\dot{p}}_{i_L} \qquad (53)$$

$$\dot{p}_{i_R} = J_{p_{i_R}} \dot{q} = \overline{\dot{p}}_{i_R} \qquad (54)$$

(3) Constraint Regarding the Center-of-Gravity Position

Since, in Formula (49), the speed must of the center of gravity must be equal to the speed of the center of gravity calculated from the center-of-gravity position trajectory generated by the center-of-gravity position trajectory generating unit 32, $$\dot{x} = J_x \dot{q} = \bar{\dot{x}} \qquad (55)$$

(4) Constraint Regarding Angular Momentum

If, in Formula (50) above, the angular momentum is constant, then $$L = J_L \dot{q} = \bar{L} \qquad (56)$$

Since each of these equations of constraint provides three degrees of freedom, a total of 18 degrees of freedom are provided by the constraints from Formulas (51) to (56) above. Here, if the position and orientation of the main body (pelvis) are used as manipulation elements, the leg joint angular speeds (total of 12 variables), and the Eulerian angular speed (three variables) and the translational speed (3 variables) of the main body among the generalized velocities of the robot state q are unknown, and the upper-body joint angular trajectory is known. Therefore, there are 18 unknowns, which match the number of equations of constraint. Consequently, it is possible to easily determine the unknown variables by solving Formulas (51) to (56) as simultaneous linear equations in 18 unknowns.

Although the order of the simultaneous equations can be reduced by modifying these equations, such equations will not be described in the specification because that is not the main purpose of the present invention.

As can be understood from the foregoing description, under the condition in which the current orientation is known and the positions and orientations of the soles and the position of the center of gravity are fixed, the Eulerian angular speed and the translational speed of the main body for conserving angular momentum are calculated. Therefore, a main body orientation $\alpha_{b,\ k+1}$ at each control cycle (time $\Delta t$) can be determined by integrating the Eulerian angular speed obtained as a solution to the simultaneous equations and by solving the following formula:

$$\alpha_{b,k+1} = \alpha_{b,k} + \dot{\alpha}_{b,k} \Delta t \qquad (57)$$

In the foregoing description, a main body orientation trajectory which satisfies Formula (3), which is a dynamic constraint regarding the rotational motion in a floor non-contact period, in addition to the dynamic constraints represented by Formulas (1) and (2) above is obtained. However, if the angular momentum is not set to a proper value, the robot may rotate considerably above the floor.

There are various methods for setting angular momentum. If it is not assumed that the whole body of the robot rotates considerably above the floor, the easiest way to set the angular momentum in a floor non-contact period to zero is by using the following formula:

$$\bar{L} = 0 \qquad (58)$$

Alternatively, it is practical to set the angular momentum by, for example, the following formula using a time T in which the legs of the robot are lifted from the floor, a traverse angle $\Gamma$, and an inertial moment $I_{zz}$ around the Z axis calculated at the non-contact start time so that angular momentum is only provided around a yaw axis.

$$\bar{L} = \begin{bmatrix} 0 \\ 0 \\ I_{zz}\Gamma/T \end{bmatrix} \qquad (59)$$

The main body orientation trajectory in a floor non-contact period is obtained by carrying out the above-described steps. In contrast, the main body orientation trajectory in a floor contact period is obtained by correcting the main body orientation basic trajectory in the floor contact period such that it smoothly connects to the main body orientation trajectory in the floor non-contact period.

More specifically, the main body orientation trajectory in the floor contact period directly preceding the floor non-contact area must be corrected so that, at the boundary between the floor contact area and the floor non-contact area, which corresponds to a floor non-contact start time, the main body orientation angle is equal to the value of the main body orientation angle basic trajectory and so that, in this orientation here, the main body orientation angular speed is equal to the angular speed of the main body orientation obtained by solving the Simultaneous Formulas (51) to (56) above.

Similarly, the main body orientation trajectory in a floor contact period immediately following a floor non-contact period must be corrected so that, at the boundary between the floor non-contact period and the floor contact period, which corresponds to a floor contact start time, the main body orientation angle equals the main body orientation angle at the termination end of the non-contact period obtained by the numerical integration of Formula (57) above and so that, in the orientation here, the main body orientation angular speed is equal to the main body orientation angular speed obtained by solving the Simultaneous Equations (51) to (56) above.

Figure 10:
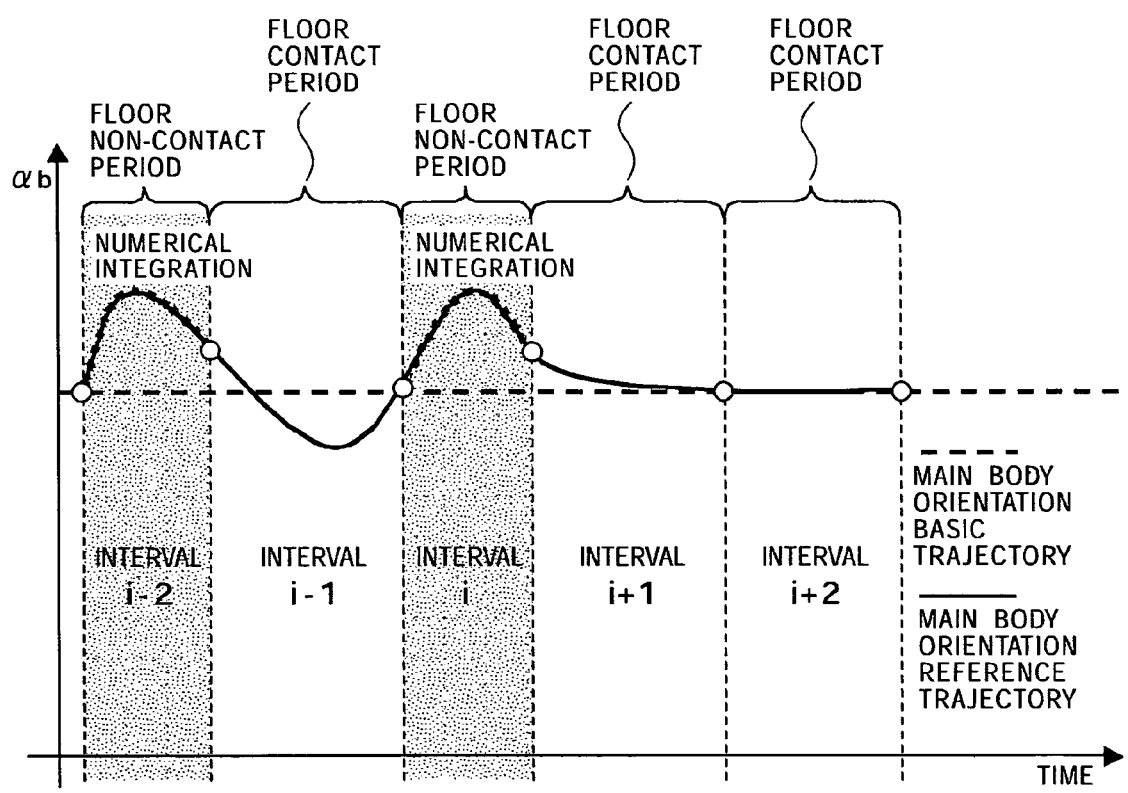
FIG. 10 shows the relationship between a main body orientation basic trajectory and a main body orientation reference trajectory in the model in which short intervals and short intervals of floor non-contact periods exist.

FIG. 10 shows the relationship between the main body orientation basic trajectory and a main body orientation reference trajectory in the model in which short intervals and short intervals in floor non-contact periods exist. In the figure, an interval i−1 corresponds to such a case. For simplifying the figure, only a roll angle trajectory is illustrated.

The starting end and termination end of the interval i−1 are joined to floor non-contact intervals. The aforementioned constraints are imposed not only at the boundary between an interval i and the interval i−1 (termination end), but also at the boundary between the interval i−1 and an interval i−2 (starting end). For example, using polynomial interpolation, such as spline interpolation, the main body orientation trajectory in a contact period is set as a curved trajectory satisfying such starting end/termination end conditions.

In contrast, unlike the interval i−1, an interval i+1 is in a floor contact period such that the starting end is adjacent to the floor non-contact period interval i and the termination end is joined to a floor contact period interval i+2. In this case, the main body orientation angular trajectory in the interval i must be set so that the boundary between the interval i+1 and the interval i (starting end) satisfies the boundary condition of the main body orientation angular trajectory in the floor non-contact period and so that the boundary between the interval i+1 and the interval i+2 (termination end) is such that the position and speed are continuous with the position and speed of the main body orientation basic trajectory. Even in this case, for example, a curved trajectory may be set so as to satisfy such starting end/termination end conditions using, for example, polynomial interpolation.

The main body orientation angular trajectory in a floor contact period that is not adjacent to a floor non-contact period is set using the main body orientation basic trajectory as a reference trajectory. The main body orientation angular trajectory in a floor contact period that is adjacent to a floor non-contact period may be formed by partly correcting the trajectory immediately before/after the floor non-contact start period or the floor contact start period instead of correcting the basic trajectory in the whole floor contact period as described above.

The method for correcting the main body orientation angular trajectory in a floor contact period differs from the method for correcting the center-of-gravity position trajectory in that it must be successively carried out in terms of time. This is because the main body orientation angular trajectory in a floor non-contact period can only be obtained by numerical integration based on Formula (57), as a result of which the boundary condition at the floor non-contact termination end is determined by this numerical integration. Actually, the numerical integration is only carried out during the floor non-contact period. Therefore, the trajectory in an adjacent floor contact period is corrected at the boundary of transition from the floor non-contact period to the floor contact period.

Accordingly, the main body orientation trajectory generating unit 33 can generate a main body orientation trajectory which satisfies the dynamic constraint in a floor non-contact period represented by Formula (3), in addition to Formula (1) representing a dynamic constraint in a floor contact period and Formula (2) representing a dynamic constraint in a floor non-contact period.

Figure 11:
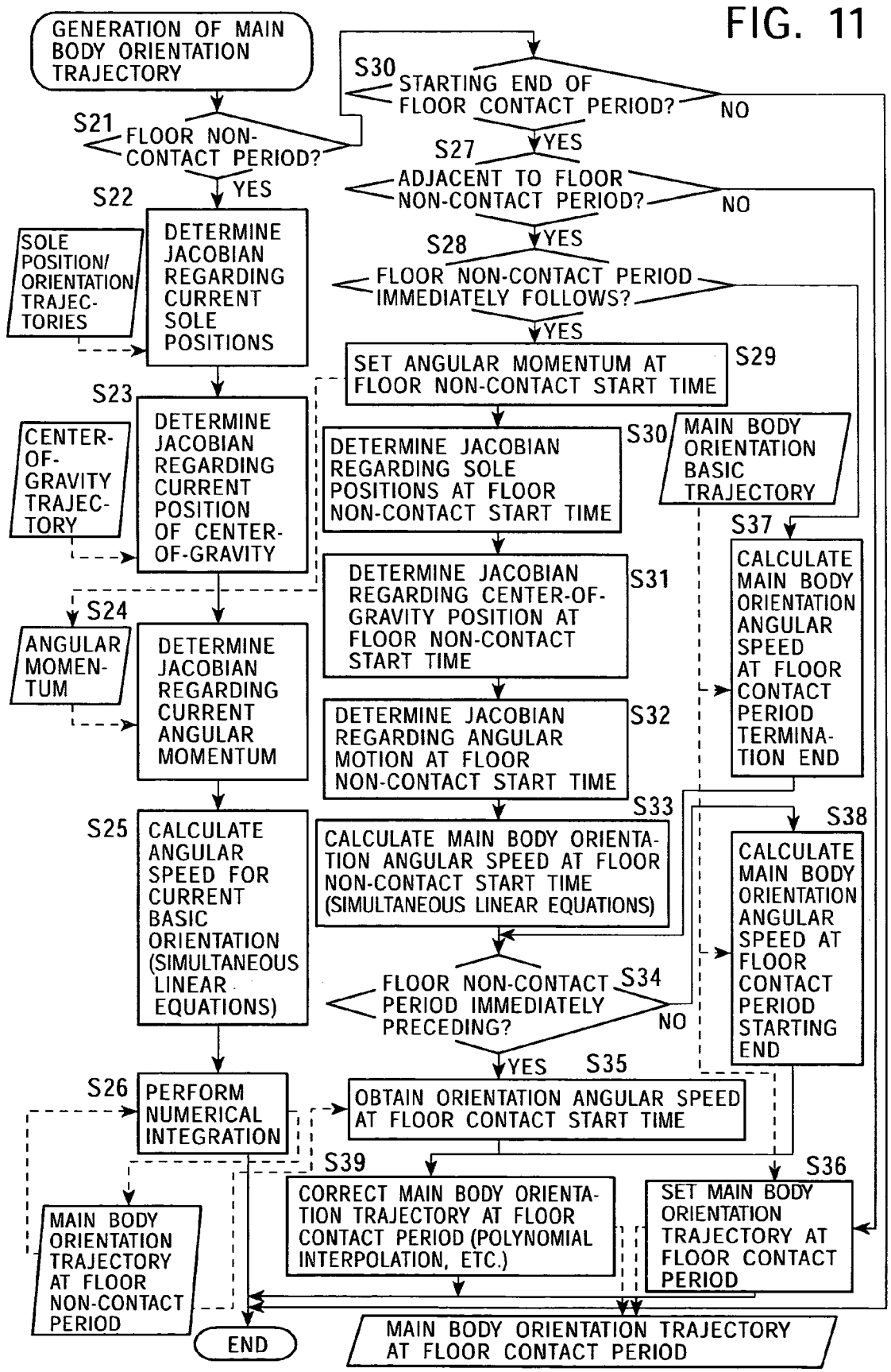
FIG. 11 is a flowchart of the steps executed by a main body orientation trajectory generating unit 33.

FIG. 11 is a flowchart showing the steps executed by the main body orientation trajectory generating unit 33.

First, a determination is made as to whether or not the current period is a floor non-contact period (Step S21).

If the period is a floor non-contact period, the process proceeds to Step S22 in order to solve the Jacobian Constraint Formulas (51) to (54) regarding the current sole positions and orientations using the sole position and orientation trajectories output from the sole position/orientation trajectory generating unit 31.

Next, using the center-of-gravity position trajectory output from the center-of-gravity position trajectory generating unit 32, the Jacobian Constraint Formula (55) regarding the current position of the center of gravity is solved (Step S23).

Next, using the angular momentum calculated before the floor non-contact start time, the Jacobian Constraint Formula (56) regarding the angular momentum is solved (Step S24).

Next, the current main body orientation angular speed is calculated by solving the simultaneous linear equations comprising the Constraint Formulas (51) to (56) (Step S25).

Lastly, the main body orientation angular trajectory in the floor non-contact period is successively generated by numerically integrating the main body orientation angular speed using Formula (57) above (Step S26).

In contrast, if a determination is made that the period is a floor contact period in Step S21, a determination is made as to whether or not the current time corresponds to the starting end of the floor contact period (Step S20).

If the current time corresponds to the starting end of the floor contact period, the process proceeds to Step S27 in order to determine whether or not the floor contact period is adjacent to a floor non-contact period.

If the floor contact period is adjacent to a floor non-contact period, a determination is further made as to whether or not a short period immediately following the floor contact period is a floor non-contact period (Step S28).

If the immediately following short period is a floor non-contact period, a target angular momentum of the floor non-contact period is calculated based on, for example, Formula (58) or (59) (Step S29).

Next, the Jacobian Constraint Formulas (51) to (54) regarding sole positions/orientations, the Jacobian Constraint Formula (55) regarding the position of the center of gravity, and the Jacobian Constraint Formula (56) regarding angular momentum are solved for the floor non-contact starting point (Steps S30, S31, and S32).

For solving these Jacobian constraint formulas, the sole position/orientation trajectories generated by the sole position/orientation trajectory generating unit 31 and the center-of-gravity position trajectory generated by the center-of-gravity position trajectory generating unit 32 at the floor non-contact start point are used in addition to the angular momentum obtained in the previous Step S29.

Next, the main body orientation angular speed at the floor non-contact start time is calculated by solving the simultaneous linear equations comprising the Jacobian Constraint Formulas (51) to (56) (Step S33). At this time, the boundary condition at the termination end of the floor contact period is determined.

Next, a determination is made as to whether or not a short interval directly preceding the floor contact period is a floor non-contact period (Step S34).

If the directly preceding short interval is a floor non-contact period, the setting of boundary conditions at both ends of the floor contact period is completed by using the main body orientation angular speed at the termination end of the floor non-contact period obtained by Step S26 as a boundary condition of the floor contact period starting end (Step S35).

In contrast, if it is determined that the directly preceding short interval is a floor contact period in Step S34, the setting of the boundary conditions of both ends of the floor contact period is completed by setting the value of a main body orientation basic trajectory from the user program as a boundary condition of the floor contact period starting end (Step S38).

If, in Step S28, the immediately following short period is also a floor contact period, the process proceeds to Step S37 in order to set the value of a main body orientation basic trajectory provided by the motion request input unit 3A as a boundary condition of the floor contact period termination end. The boundary condition of the floor contact period starting end is determined by carrying out the same operations as those that are carried out when, in Step S28, a determination is made that the short interval immediately following the floor contact period is a floor non-contact period. Accordingly, the setting of the boundary conditions of both ends of the floor contact period is completed.

By the above-described operations, the boundary conditions of both ends of the floor contact period when the floor contact period is adjacent to a floor non-contact period are set. In Step S39, in order to satisfy the boundary conditions, a main body orientation trajectory in the floor contact period is formed using a curve by, for example, polynomial interpolation.

When, in Step S27, a determination is made that the floor contact period is not adjacent to any floor non-contact period, the main body orientation basic trajectory from the motion request input unit 3A can be used for the main body orientation trajectory in the floor contact period, so that, in Step 36, the main body orientation basic trajectory is set as the main body orientation trajectory in the floor contact period, thereby completing the operations.

Returning to FIG. 3, the description of the functions structure of the control system of the robot of the embodiment will be continued. In the description up to now, the upper-body joint angle reference trajectory, the main body orientation reference trajectory, the center-of-gravity position reference trajectory, and the sole position orientation reference trajectories from the user program are all obtained. By performing interpolation at each control period on these trajectories by the interpolation units (the upper-body joint angle reference trajectory interpolation unit 34, the main body orientation reference trajectory interpolation unit 35, the center-of-gravity position reference trajectory interpolation unit 36, and the sole position/orientation reference trajectory interpolation unit 37) disposed at the respective trajectories, the upper-body joint angles, the main body orientation angle, the position of the center of gravity, and the positions and orientations of the soles can be calculated. Since the main body orientation angle trajectory in a floor non-contact period is provided by numerical integration, interpolation by the main body orientation reference trajectory interpolation unit 35 is not particularly required.

The mass point distribution adjusting unit 38 adjusts the mass point distribution of the whole body so as to set the main body orientation and the position of the center of gravity of a next time obtained above. More specifically, with the main body orientation, the positions and orientations of the soles, and the upper-body joint angles being fixed to desired values, the position ($x_B$, $y_B$, and $z_B$) of the main body (pelvis) is manipulated to adjust the mass point distribution of the whole body so that the center of gravity of the whole body is at the position of the center of gravity obtained above. Under such a geometrical constraint, the speed of the main body and the speed of center of gravity have the following relationship when Jacobian $J_B$ is used.

$$\dot{x} = J_B \dot{x}_B \tag{60}$$

When a difference $dx = x_{k+1} - x_k$ exists between a current center-of-gravity position $x_k$ of the robot and a center-of-gravity position $x_{k+1}$ of a next time obtained by solving the ZMP equation, an approximation of a manipulation amount $dx_B$ of the main body position can be obtained by the following formula:

$$dx_B = J_B^{-1} dx \tag{61}$$

Here, the upper-body joint angle reference value input from the user program is reflected in the calculation of the center of gravity.

From the above, when a current main body position is $x_{Bk}$, a main body position $x_{Bk+1}$ after adjusting the mass-point distribution for realizing the main body orientation and the center-of-gravity position of the next time obtained above is obtained by the following formula:

$$x_{Bk+1} = x_{Bk} + J_B^{-1} dx \tag{62}$$

If the difference between the center-of-gravity position and the reference center-of-gravity position obtained from Formula (62) above is still large, Formula (62) may be repeatedly used to perform convergence calculation until the difference is sufficiently small.

The joint angle calculating unit 39 determines the joint angles of the legs so as to achieve the position of the center of gravity of the next time obtained from the mass point distribution adjusting unit 38 and the sole positions and orientations of the next time obtained from the sole position/orientation trajectory generating unit 31. This can be executed by, for example, a known reverse kinematic calculation after determining the relative positions and orientations of the legs.

The leg joint angles obtained here and the upper-body reference joint angles obtained from the user program are output as whole-body joint angle reference values of the next time.

By the control system of the robot shown in FIG. 3, when the legged mobile robot not only walks but also hops or jumps or runs or successively performs these motions, the robot can move by immediately (or in real time) calculating a dynamically stable motion pattern while satisfying external requests such as footstep and period.

Although in the embodiment described in the specification the center-of-gravity position and the main body orientation angle are used as state quantities, other state quantities may be used. For example, the position of a portion (such as the waist) near the center of gravity may be used instead of the position of the center of gravity or the hip joint angles may be used instead of the main body orientation angle. Even in such cases the same advantages of the present invention can be provided. Alternatively, any joint angle may be used as a state quantity to form what is called a whole-body cooperative control system.

In the embodiment, the generation of the whole-body motion is executed every control period, but the present invention is not limited thereto. Trajectory generation may be executed in a longer cycle, so that, for example, the steps up to the generation of trajectories (corresponding to Steps S1 to s4 in FIG. 4) are executed only when the floor contact state changes (boundary at which the robot is supported by both legs, one leg, or no legs), and only the path interpolation steps and the step which follows (Steps S5 to S7 in the same figure) are executed every control period. However, in this case, a motion request is reflected less immediately.

Although, in the embodiment, the motion state of the current time obtained from a previous generation of a whole-body motion is set as the initial condition of a generation of a whole-body motion of a next period in order to determine a motion state which smoothly connects to the current motion state, the gist of the present invention is not limited thereto. For example, by measuring the actual motion state of the robot using, for example, the pelvis acceleration sensor A1 and the gyro G1, the sole sensors F1 to F8, the distance measuring sensors (D1 to D8), the acceleration sensors A2 and A3, and the gyros G2 and G3, it is possible to form a control system which generates a whole-body motion reflecting the actual state like a robot walking controller disclosed in Nonpatent Document 5.

Supplement

The present invention is described in detail while referring to a particular embodiment. However, it is obvious that modifications and substitutions may be made with regard to the embodiment by anyone skilled in the art within a scope not departing from the gist of the present invention.

The gist of the present invention is not necessarily limited to a product called a "robot." In other words, the present invention may similarly be applied to a product of another industrial field, such as a toy, as long as the product is a mechanical device which moves like a human being by making use of electric or magnetic action.

In short, the present invention has been described in terms of an embodiment, so that this is not to be construed as limiting the content of the invention. In order to determine the gist of the present invention, the claims recited at the beginning should be referred to.

INDUSTRIAL APPLICABILITY

The present invention can provide a device and a method for controlling the motion of an excellent legged mobile robot capable of seamlessly changing between walking/stopping states and running/hopping or jumping states while properly maintaining dynamic balance even during a change between irregular floor contact motion and floor non-contact motion.

The present invention can also provide a device and a method for controlling the motion of an excellent legged mobile robot which can generate in real time a stable motion pattern for changing between a floor contact motion and a floor non-contact motion.

First, since there are few limitations regarding mechanical models, the present invention is advantageous compared to inventions which, for example, assume that the legs are massless. (Refer to, for example, "Hanpuku Choyaku Model Biomechanism 5," 1985, published by University of Tokyo Press, Kiyotoshi Matsuoka, pp. 4501-4509; and the International Journal of Robotics Research, vol. 3, No. 2, 1984, Marc H. Raibert and two other: "Experiments in Balance with a 3D One-Legged Hopping Machine," pp. 75-92.) This is based on the fact that, according to the present invention, the mass point distribution state of the whole body is reflected in the dynamic constraints during both a floor contact period and a floor non-contact period. Present-day general legged mobile robots have a considerable number of actuators installed in the legs. Therefore, the masses of the legs cannot be ignored. Consequently, the present invention can be applied, particularly, to a humanoid robot having actuators providing six or more degrees of freedom per leg, and, thus, can be of wide application.

Second, according to the present invention, the motion of a legged mobile robot having a floor contact period and a floor non-contact period can be controlled. Most of the related control systems of legged mobile robots control walking, and, thus, do not control a wider range of motions having a floor non-contact period, such as running and hopping. In contrast, according to the present invention, robots can realize more general motions in a case in which the robots walk, stop, run, hop, and jump. Therefore, legged mobile robots have considerably increased capability of covering a distance and of maintaining balance, so that they can, for example, jump over a gap, jump down from a higher level, or change their standing positions by hopping for maintaining balance.

Third, according to the present invention, the use of the method based on using ZMP as a standard of determining stability (for example, refer to Nonpatent Document 1) is extended to general motions having a floor non-contact period, so that geometric constraints are easily imposed upon the trajectories of the end points of the legs. For example, desired values, such as footstep and period when running or heights of the soles when jumping, can be achieved while maintaining dynamic balance. In addition, the present invention is applicable to situations where constraints on the trajectories of the ends of the legs are important, such as running up steps or running while bringing a foot onto the floor in accordance with the widths of successive gaps obtained from viewing angle information. These motions are difficult to realize by a related motion controlling system which cannot impose geometric constraints on the trajectories of the end points.

Fourth, since the present invention makes it possible to generate a dynamically stable motion pattern in real time, requests for changes in the motion of the upper body or for changes in crural motion, such as footstep, step period, traverse angle, and heights of soles, asynchronously input can be satisfied while dynamically maintaining balance, so that flexible and various motions having a floor non-contact period and a floor contact period can be realized. It is very difficult to maintain dynamic stability while satisfying such outside requests by a method of previously generating a motion pattern offline or by related controlling systems which only maintain balance.

The invention claimed is:

1. A robot apparatus comprising:
   movable means;
   center-of-gravity horizontal position trajectory determining means for solving a motion equation with a boundary condition regarding a center-of-gravity horizontal position trajectory of the robot apparatus so that the moment around a horizontal axis at a point within a support polygon defined by a plurality of portions of the movable means contacting a floor is zero or approximately equal to zero, and so that at least the position and speed of the center of gravity of the robot apparatus in a next control period are connected to the position and speed of the center of gravity of the robot apparatus in a current control period when the movable means is in contact with the floor;
   center-of-gravity vertical position trajectory determining means for solving a motion equation with a boundary condition regarding a center-of-gravity vertical position trajectory of the robot apparatus so that vertical translational force acting upon the robot apparatus other than gravity is equal to or approximately equal to zero, and so that the vertical position and speed of the center of gravity of the robot apparatus in the next control period are connected to the vertical position and speed of the center of gravity of the robot apparatus in the current control period when the movable means is not in contact with the floor; and
   motion state determining means for determining a motion state of the robot apparatus in the next control period so that the moment around the center of gravity of the robot apparatus is equal to or approximately equal to zero, and so that the position of the center of gravity determined by the center-of-gravity horizontal position trajectory determining means and the center-of-gravity vertical position trajectory determining means is satisfied when the movable means is not in contact with the floor.

2. A robot apparatus according to claim 1, wherein the motion state determining means determines the motion state of the robot apparatus in the next control period using Jacobian determined from a motion state of the robot apparatus in the current control period.

3. A robot apparatus according to claim 1, wherein the center-of-gravity horizontal position trajectory determining means solves the motion equation with the boundary condition regarding the center-of-gravity horizontal position trajectory of the robot apparatus so that ZMP where the moment around a pitch axis and the moment around a roll axis of the robot apparatus are zero exists within the support polygon instead of the moment around the horizontal axis at the point within the support polygon being equal to or approximately equal to zero when the movable means is in contact with the floor.

4. A robot apparatus according to claim 1, wherein the center-of-gravity horizontal position trajectory determining means solves the motion equation with the boundary condition regarding the center-of-gravity horizontal position trajectory of the robot apparatus so that the horizontal momentum is substantially constant instead of the horizontal translational force being equal to or approximately equal to zero when the movable means is not in contact with the floor.

5. A robot apparatus according to claim 1, further comprising center-of-gravity position/speed measuring means for measuring the position and the speed of the center of gravity of the robot apparatus, wherein the center-of-gravity horizontal position trajectory determining means and the center-of-gravity vertical position trajectory determining means set the position and speed of the center of gravity of the robot apparatus in the current control period measured by the center-of-gravity position/speed measuring means as an initial boundary condition of the next control period for the motion equations with the boundary conditions.

6. A robot apparatus according to claim 1, wherein the motion state determining means determines the motion state of the robot apparatus using the orientation angle of a main body of the robot apparatus as a manipulation quantity.

7. A robot apparatus according to claim 1, wherein the motion state determining means determines the motion state of the robot apparatus using a waist joint angle of the robot apparatus as a manipulation quantity.

8. A robot apparatus according to claim 1, wherein the motion state determining means determines the motion state of the robot apparatus in the next control period so that the angular momentum around the center of gravity is constant instead of the moment around the center of gravity of the robot apparatus being equal to or approximately equal to zero when the movable means is not in contact with the floor.

9. A robot apparatus comprising:
movable means;
center-of-gravity horizontal position trajectory determining means for calculating a center-of-gravity horizontal position trajectory of the robot apparatus based on the moment around a horizontal axis acting upon the robot apparatus and a temporal continuity of at least the position and speed of the center of gravity of the robot apparatus when the movable means is in contact with a floor;
center-of-gravity vertical position trajectory determining means for calculating a center-of-gravity vertical position trajectory of the robot apparatus based on vertical translational force acting upon the robot apparatus other than gravity and a temporal continuity of at least the vertical position and the speed of the center of gravity of the robot apparatus when the movable means is not in contact with the floor; and
motion state determining means for determining a motion state of the robot apparatus so that the moment around the center of gravity of the robot apparatus and the position of the center of gravity determined by the center-of-gravity horizontal position trajectory determining means and the center-of-gravity vertical position trajectory determining means are satisfied when the movable means is not in contact with the floor.

10. A device for controlling motion of a robot apparatus comprising movable means, the device comprising:
center-of-gravity horizontal position trajectory determining means for solving a motion equation with a boundary condition regarding a center-of-gravity horizontal position trajectory of the robot apparatus so that the moment around a horizontal axis at a point within a support polygon defined by a plurality of portions of the movable means contacting a floor is zero or approximately equal to zero, and so that at least the position and speed of the center of gravity of the robot apparatus in a next control period are connected to the position and speed of the center of gravity of the robot apparatus in a current control period when the movable means is in contact with the floor;
center-of-gravity vertical position trajectory determining means for solving a motion equation with a boundary condition regarding a center-of-gravity vertical position trajectory of the robot apparatus so that vertical translational force acting upon the robot apparatus other than gravity is equal to or approximately equal to zero, and so that the vertical position and speed of the center of gravity of the robot apparatus in the next control period are connected to the vertical position and speed of the center of gravity of the robot apparatus in the current control period when the movable means is not in contact with the floor; and
motion state determining means for determining a motion state of the robot apparatus in the next control period so that the moment around the center of gravity of the robot apparatus is equal to or approximately equal to zero, and so that the position of the center of gravity determined by the center-of-gravity horizontal position trajectory determining means and the center-of-gravity vertical position trajectory determining means is satisfied when the movable means is not in contact with the floor.

11. A method for controlling motion of a robot apparatus comprising movable means, the method comprising the steps of:
determining a center-of-gravity horizontal position trajectory in which a motion equation with a boundary condition regarding the center-of-gravity horizontal position trajectory of the robot apparatus is solved so that the moment around a horizontal axis at a point within a support polygon defined by a plurality of portions of the movable means contacting a floor is zero or approximately equal to zero, and so that at least the position and speed of the center of gravity of the robot apparatus in a next control period are connected to the position and speed of the center of gravity of the robot apparatus in a current control period when the movable means is in contact with the floor;
determining a center-of-gravity vertical position trajectory in which a motion equation with a boundary condition regarding the center-of-gravity vertical position trajectory of the robot apparatus is solved so that vertical translational force acting upon the robot apparatus other than gravity is equal to or approximately equal to zero, and so that the vertical position and speed of the center of gravity of the robot apparatus in the next control period are connected to the vertical position and speed of the center of gravity of the robot apparatus in the current control period when the movable means is not in contact with the floor; and
determining a motion state of the robot apparatus in the next control period so that the moment around the center of gravity of the robot apparatus is equal to or approximately equal to zero, and so that the position of the center of gravity determined by the center-of-gravity horizontal position trajectory determining means and the center-of-gravity vertical position trajectory determining means is satisfied when the movable means is not in contact with the floor.

12. A method for controlling motion of a robot apparatus according to claim 11, wherein, in the motion state determining step, the motion state of the robot apparatus in the next control period is determined using Jacobian determined from a motion state of the robot apparatus in the current control period.

13. A method for controlling motion of a robot apparatus according to claim 11, wherein, in the step of determining the center-of-gravity horizontal position trajectory, the motion equation with the boundary condition regarding the center-of-gravity horizontal position trajectory of the robot apparatus is solved so that ZMP where the moment around a pitch axis and the moment around a roll axis of the robot apparatus are zero exists within the support polygon instead of the moment around the horizontal axis at the point within the support polygon being equal to or approximately equal to zero when the movable means is in contact with the floor.

14. A method for controlling motion of a robot apparatus according to claim 11, wherein, in the step of determining the center-of-gravity horizontal position trajectory, the motion equation with the boundary condition regarding the center-of-gravity horizontal position trajectory of the robot apparatus is solved so that the horizontal momentum is substantially constant instead of the horizontal translational force being equal to or approximately equal to zero when the movable means is not in contact with the floor.

15. A method for controlling motion of a robot apparatus according to claim 11, further comprising the step of measuring the position and the speed of the center of gravity of the robot apparatus, wherein, in the step of determining the center-of-gravity horizontal position trajectory and in the step of determining the center-of-gravity vertical position trajectory, the position and speed of the center of gravity of the robot apparatus in the current control period measured in the step of measuring the position and speed of the center of gravity are set as an initial boundary condition of the next control period for the motion equations with the boundary conditions.

16. A method for controlling motion of a robot apparatus according to claim 11, wherein, in the motion state determining step, the motion state of the robot apparatus is determined using the orientation angle of a main body of the robot apparatus as a manipulation quantity.

17. A method for controlling motion of a robot apparatus according to claim 11, wherein, in the motion state determining step, the motion state of the robot apparatus is determined using a waist joint angle of the robot apparatus as a manipulation quantity.

18. A method for controlling motion of a robot apparatus according to claim 11, wherein, in the motion state determining step, the motion state of the robot apparatus in the next control period is determined so that the angular momentum around the center of gravity is constant instead of the moment around the center of gravity of the robot apparatus being equal to or approximately equal to zero when the movable means is not in contact with the floor.

19. A method for controlling motion of a robot apparatus comprising movable means, the method comprising the steps of:

determining a center-of-gravity horizontal position trajectory in which the center-of-gravity horizontal position trajectory of the robot apparatus is calculated based on the moment around a horizontal axis acting upon the robot apparatus and a temporal continuity of at least the position and speed of the center of gravity of the robot apparatus when the movable means is in contact with a floor;

determining a center-of-gravity vertical position trajectory in which the center-of-gravity vertical position trajectory of the robot apparatus is calculated based on vertical translational force acting upon the robot apparatus other than gravity and a temporal continuity of at least the vertical position and the speed of the center of gravity of the robot apparatus when the movable means is not in contact with the floor; and determining a motion state of the robot apparatus so that the moment around the center of gravity of the robot apparatus and the position of the center of gravity determined in the step of determining the center-of-gravity horizontal position trajectory and the step of determining the center-of-gravity vertical position trajectory is satisfied when the movable means is not in contact with the floor.

* * * * *